US012584870B2

(12) United States Patent
Mulloth

(10) Patent No.: US 12,584,870 B2
(45) Date of Patent: Mar. 24, 2026

(54) METHOD FOR SCANNING OF AN OBJECT IN A SCANNING APPARATUS

(71) Applicant: ROLLS-ROYCE PLC, London (GB)

(72) Inventor: Akhil Mulloth, Derby (GB)

(73) Assignee: ROLLS-ROYCE PLC, London (GB)

( * ) Notice: Subject to any disclaimer, the term of this patent is extended or adjusted under 35 U.S.C. 154(b) by 154 days.

(21) Appl. No.: 18/441,577

(22) Filed: Feb. 14, 2024

(65) Prior Publication Data

US 2024/0295509 A1 Sep. 5, 2024

(30) Foreign Application Priority Data

Mar. 3, 2023 (GB) ...................................... 2303164

(51) Int. Cl.
G01N 23/18 (2018.01)
G01N 23/046 (2018.01)
G01N 23/083 (2018.01)

(52) U.S. Cl.
CPC ........... G01N 23/18 (2013.01); G01N 23/046 (2013.01); G01N 23/083 (2013.01); *G01N 2223/1016* (2013.01); *G01N 2223/309* (2013.01); *G01N 2223/3306* (2013.01); *G01N 2223/409* (2013.01); *G01N 2223/419* (2013.01); *G01N 2223/63* (2013.01); *G01N 2223/646* (2013.01)

(58) Field of Classification Search
None
See application file for complete search history.

(56) References Cited

U.S. PATENT DOCUMENTS

| | | | |
|---|---|---|---|
| 4,601,050 A | 7/1986 | Tanaka | |
| 9,909,999 B2 * | 3/2018 | Karlen | ................... G01N 23/18 |
| 10,416,096 B2 * | 9/2019 | Freeman | ............. G01N 23/043 |
| 10,416,097 B2 * | 9/2019 | Freeman | ............. G01N 23/046 |

(Continued)

FOREIGN PATENT DOCUMENTS

| | | |
|---|---|---|
| EP | 3096132 A1 | 11/2016 |
| GB | 1005557 A | 9/1965 |
| JP | S55-47841 A | 4/1980 |

OTHER PUBLICATIONS

Jul. 23, 2024 Search Report issued in European Patent Application No. 24156230.5.

(Continued)

*Primary Examiner* — Thomas R Artman
(74) *Attorney, Agent, or Firm* — OLIFF PLC

(57) ABSTRACT

A method for scanning of an object in a scanning apparatus includes disposing the object and a complementary object on a support of the apparatus, so that the objects are positioned between an imaging beam emitting element and an imaging beam receiving element oppositely disposed to either side of the support. The support is rotatable relative to the emitting and receiving elements about an axis of rotation to allow creation of an image from projections each taken at a different relative angle. A volume of the complementary object is solid or filled with a filling material and the complementary object is configured to reduce the variation in imaging beam attenuation across the objects or the part to be scanned of the object at the multiple relative angles of rotation. The method includes operating the scanning apparatus at the multiple relative angles of rotation to produce an image of the object.

18 Claims, 18 Drawing Sheets

(56)     References Cited

U.S. PATENT DOCUMENTS

| | | | | |
|---|---|---|---|---|
| 10,620,139 | B2 * | 4/2020 | Karlen | G01N 23/083 |
| 12,111,148 | B2 * | 10/2024 | Ferro | G01N 23/04 |
| 2012/0033787 | A1 * | 2/2012 | Schreiber | G01N 23/04 |
| | | | | 378/58 |
| 2016/0282285 | A1 * | 9/2016 | Karlen | G01N 23/083 |
| 2016/0334344 | A1 * | 11/2016 | Freeman | F01D 5/12 |
| 2016/0334345 | A1 * | 11/2016 | Freeman | G01N 23/046 |
| 2018/0156743 | A1 * | 6/2018 | Karlen | G01N 23/083 |
| 2022/0373325 | A1 * | 11/2022 | Ferro | G01B 15/04 |
| 2024/0201109 | A1 * | 6/2024 | Mulloth | G01N 23/046 |
| 2024/0219319 | A1 * | 7/2024 | Mulloth | G01N 23/083 |
| 2024/0219320 | A1 * | 7/2024 | Mulloth | G01N 23/046 |
| 2024/0219321 | A1 * | 7/2024 | Mulloth | A61B 6/027 |
| 2024/0295509 | A1 * | 9/2024 | Mulloth | G01N 23/046 |

OTHER PUBLICATIONS

Sep. 14, 2023 Search Report issued in British Patent Application No. 2303164.4.

* cited by examiner

_50_

DISPOSING AN OBJECT AND COMPLEMENTARY OBJECT ON A SUPPORT OF A SCANNING APPARATUS _S10_

OPERATING THE SCANNING APPARATUS AT MULTIPLE RELATIVE ANGLES OF ROTATION _S20_

METHOD FOR SCANNING OF AN OBJECT IN A SCANNING APPARATUS

TECHNICAL FIELD

The present disclosure relates to a method for scanning of objects in a scanning apparatus such as a computed tomography, CT, scanning apparatus. The present disclosure relates further to a combination of a scanning apparatus for scanning of an object and an object in the scanning apparatus.

BACKGROUND

The present disclosure is relevant to many scanning technologies, but a primary application is three-dimensional x-ray computed tomography, or CT, which combines multiple x-ray images to recreate a 3-dimensional, 3D, volume, so may be referred to as 3DCT scanning.

An x-ray source produces polychromatic x-rays that penetrate a part and form an x-ray image on a detector. The object is (usually) rotated through 360 degrees while being imaged multiple times. The x-ray images are combined via a process called reconstruction to produce a 3D representation of the object. Surface determination is then performed to separate the object volume from the background. Subsequently, cross sections of the object may be viewed by the user. Various alternative apparatuses for CT scanning are seen in known arrangements. In a medical scanner, for example, the object is fixed with the source and detector orbiting the object. There are other options on the market that allow the height to change to take a helical scan or do a slight shift to the height to do a pixel shift scan.

CT and other scanning may be used to inspect non-line-of-sight areas of objects, for example vanes and turbine blades, that are not accessible to alternative inspection techniques such as bore scopes. This is important to be able to deliver novel geometries, for example for cast metal turbine blades and additively manufactured components.

The known arrangements teach that 3DCT scans of cast metal turbine blades, for example, are to be performed on one part at a time as the composition of the part may effectively attenuate the CT scanning x-ray beam. The known arrangements also teach that the object is to be positioned in the middle of the scanning frame, for instance with a vertical axis of rotation of a rotatable CT scanning platform extending through the object. The object may be inclined to create an angle between the axis of rotation and a longitudinal axis of the object. In this case, the orientation of the object may be selected to minimise the path length that the x-ray penetrates. Known arrangements teach that bigger and thicker objects generally produce lower quality scans as they create more beam scattering. Aiming to reduce beam hardening and poor penetration, the known arrangements teach to increase the voltage of the x-ray emitting apparatus and to use a physical or software-based scatter correction. It is desirable to improve the quality and/or efficiency of CT scanning of objects. Increasing the voltage produces a higher number of x-rays capable of penetrating more material. The same part scanned at a higher voltage will produce a higher quality image for numerous reasons. However, as taught in known arrangements, the voltage should be limited as too high a voltage will reduce the difference in contrast between two materials as the material will attenuate fewer x-rays.

A cylinder is the ideal shape to scan because it has the same thickness whatever the angle of rotation of the table with respect to the emitter and receiver. Components with complex cross sections and/or cross sections that change along their length such as turbine blades and vanes face particular scanning challenges. A turbine blade may present an aerofoil cross-section with a leading edge and a trailing edge face. The leading-edge cross-section is thicker than the trailing edge cross-section. The aerofoil section of the object may have a concave blade surface on one side bounded at either end by the leading and trailing edges and a convex blade surface on the other side. Optimising the CT scan parameters for all of the parts at the same time is difficult. In particular, the concave surface of the blade has the potential to concentrate or converge scattered x-rays and create a high level of noise on the concave side, leading to concave side (or concave wall) effects. A concave wall effect produces image artifacts formed on or around the image of the object due to beam hardening and haloing.

SUMMARY OF THE INVENTION

According to one aspect, there is provided a method for scanning of an object in a scanning apparatus. The method comprises disposing the object and a complementary object on a support of the scanning apparatus, so that the object and complementary object are positioned between an imaging beam emitting element and an imaging beam receiving element oppositely disposed to either side of the support. The support is rotatable relative to the emitting and receiving elements about an axis of rotation to allow creation of an image from projections, each taken at a different relative angle of rotation. A volume of the complementary object is solid or filled with a filling material and the complementary object is configured to reduce the variation in imaging beam attenuation across the complementary object and the object or the part to be scanned of the object at the multiple relative angles of rotation. The method further comprises operating the scanning apparatus at the multiple relative angles of rotation to produce an image of the object.

Of course, if the complementary object is disposed adjacent the part to be scanned of the object, the remaining part of the object, that is the part not to be scanned, may be disposed on the support so that (only) the complementary object and part of the object to be scanned are in the scanning region.

Surprisingly, the inventor has found that use of a complementary object (which is thus in a fixed stationary relationship with the object or part to be scanned of the object), and with a solid volume or filling material or void within the complementary object, can significantly improve the scan quality for many objects, especially those with complex cross sections and/or cross sections that change along their length.

In one scenario, the scanning apparatus is a two-dimensional or three-dimensional computational tomography, CT, scanning apparatus, with a table or platform which is rotatable about a vertical axis, and with oppositely disposed x-ray emitter and receiver units to either side of the table. The imaging beam emitting element may emit an energy beam within the x-ray region of the electromagnetic spectrum. The emitted x-rays may form a polychromatic x-ray spectrum. The x-rays may be formed by a tungsten metal element within the imaging element. Of course, the emitting element may emit other energy forms such as gamma rays or ultrasound or any other energy beam suitable for scanning. The imaging beam emitting element and the imaging beam receiving element may be oppositely disposed to either side of the support.

The complementary object or vessel or container may be directly supported on the platform or held within a jig (or on a support in the form of a jig). The complementary object may extend at an angle to the vertical to facilitate cross-sections at preferred angles through the complementary object and object.

The complementary object may be disposed (and/or configured) so that it does not completely surround the object or the part to be scanned of the object. The complementary object may be positioned either adjacent to the object, spaced from the object or internally within the object. The complementary object may be positioned directly adjacent the object on, for example, the same side of the scanning platform, relative to a plane intersecting the axis of rotation, or the complementary object and object may be disposed on opposite sides of the scanning platform. The complementary object and object may be disposed so that their respective centres, for example centres of symmetry and/or centres of mass, are equidistant from the axis of rotation.

The complementary object may be disposed within the object to be scanned. The object may have voids or holes of cavities in which the complementary object may be placed.

The object and complementary object may be positioned on the support in a configuration that reduces the variation in material thickness penetrated at the multiple relative angles of rotation. The object and complementary object may be elongate and a shape of the configuration formed by the combined shape of the object and complementary object in the configuration may have a lower aspect ratio than a single one of the object and/or complementary object.

This can give a shape of the configuration which is more similar to the "ideal" cylindrical shape for scanning in which thickness of material to be penetrated is constant for all the projections. In other words, the configuration may minimise the variation in material thickness between the emitter and receiver penetrated at the multiple relative angles of rotation. The aspect ratio of the configuration may be less than two thirds, or even less than half, of the aspect ratio of a single one of the object and/or complementary object. The aspect ratio of the combined shape may be computed using the aspect ratio of a rectangular bounding box around the two (or more) cross sections.

Facing surfaces of the object or part to be scanned of the object and complementary object may be equally or substantially equally spaced across their full extent. For example, the surface of the complementary object adjacent the turbine blade may be such that if the complementary object and turbine blades were to be interconnected there would be no air gap at any point between the surfaces, or a minimal air gap. The complementary object and object may be disposed so that their surfaces are in direct contact, or they may be separated by a border region, made from, for example, a polymer film. Additionally and/or alternately, the complementary object and object may be separated by an air gap, which may be of a substantially constant length at any point along the facing surfaces.

The filling material or the solid volume may have an imaging beam attenuation close to the imaging beam attenuation of the material of the object or part to be scanned of the object (such as within 20% or 10% of the imaging beam attenuation of the material of the object or part to be scanned of the object). The filling material or solid volume may have the same or substantially the same imaging beam attenuation as the imaging beam attenuation of the material of the object or part to be scanned of the object. The effectively constant attenuation coefficient across the filling material or solid volume and object may improve the image quality for each projection taken at varying angles. Averaging out the material thickness by, for example filling in any concave surfaces, may also reduce artifacts caused by x-rays scattering off the object's surface and the concave wall effect, even with a filling material or solid volume having a different level of attenuation from the object.

According to one aspect, the method may further comprise filling the volume of the complementary object with the filling material. The filling material may be poured or added into the complementary object. The filling material may be poured or added into the complementary object after the complementary object has been positioned relative to the object.

The filling material may be in the form of pieces, powder, grains or fluid. The filling material may, for example, be either metal powder or polymer powder and thus may be poured into the complementary object. The filling material may be in the same material as the object or part to be scanned of the object.

The resultant combined (horizontal) cross section of the complementary object and object or part to be scanned of the object may be circular or nearly circular or may form an annulus or near annulus. The complementary object may comprise one or more walls together forming a part circular cross section or part cylindrical surface. The part cylindrical or part circular cross section surface may be on the opposite side of the complementary object to a surface facing the object. If the complementary object is hollow (to receive a filling material) the walls forming the hollow complementary object may be formed of a polymer film or wall and may contain the filling material.

One or more, for example two, complementary objects may be positioned adjacent, spaced apart or within the object. The one or more complementary objects may be positioned so that the object is in between the one or more complementary objects.

The object and complementary object may be in an adjacent configuration and the configuration may further comprise a border region, such as an air gap and/or film layer, between the object or part to be scanned of the object and the complementary object with an imaging beam attenuation different from the imaging beam attenuation of the object. For example, the border region has a lower imaging beam attenuation than the imaging beam attenuation of the object or part to be scanned of the object. The region may be formed of a material with a lower density than the object or part to be scanned of the object, for example the region may be an air gap.

The object may be wrapped or coated in one or more films, sleeves or walls, for example a polymer film such as cling film or a polymer membrane or a polymer bag or a polymer wall (which may be 3D printed), to provide a boundary between the object and the complementary object. The one or more films, sleeves or walls may form the border region. The object may be wrapped in the film, inserted into the sleeve or placed between moulded walls. This may prevent the object from contacting the complementary object and may therefore prevent contamination of the object. Any suitable material may be used to cover the object, either totally or partially. The film, wall or sleeve may have a low imaging beam attenuation and may therefore aid identification of the object in the configuration formed by the complementary object and object by providing a contrast in the scan image at the object's surface and act as or delimit the border region mentioned above.

If the complementary object is placed within the object, the border region, such as the film layer and/or optional air gap, may be formed by surrounding or partially surrounding the object or complementary object with a protective film or wall or sleeve.

The complementary object may be offset from the axis of rotation so that its centre (for example centre of mass and/or centre of symmetry) is displaced from the axis, for example by at least half the minimum extent of the complementary object taken in any horizontal plane. The complementary object and object may be positioned so that no part to be scanned of the complementary object or no part to be scanned of the object intersects the axis of rotation.

The object or part to be scanned of the object may have a density variation, and the complementary object may have a complementary density variation such that for one or more of the projections each taken at a different relative angle of rotation the variation in the average density across the complementary object and object or part to be scanned of the object is reduced. The variable density object may have a relatively high density, medium density, and low-density region, across its extent. The object may be placed adjacent a complementary object having an inverse, or complementary, density profile. That is, the high-density region of the object is adjacent the low-density region of the complementary object, for example. In this way, the variation in imaging beam attenuation across the complementary object and the object is reduced for projections taken at multiple relative angles of rotation. The object may have a continuously varying density profile and the complementary object may have a complementary (inversely) continuously varying density profile.

The complementary object may include a void to complement a void in the object and/or the shape or contours of the object. For example, the void in the complementary object may be positioned opposite a relatively thin region of the object. If a part of the object has an inclusion made of a denser material than the rest of the object, the complementary object may have a similar or complementary insert or void to compensate for the higher beam attenuation properties of the dense material.

The complementary void may be filled with a filling material to reduce the variation in imaging beam attenuation for multiple relative angles of rotation. For example, the complementary void may be filled with a relatively dense material so that when x-rays penetrate the complementary object, they are attenuated more than, for example, a less dense material the object may be made from. Of course, the opposite is also true, the void may be filled with a less dense material to complement, for example, a (region of) dense material the object may be made from.

The void in the complementary object may reduce the material path length, and/or beam attenuation, across complementary object and object, for multiple relative angles of rotation. The combined configuration of the object and complementary object may therefore reduce the variation in imaging beam attenuation across the object and complementary object for projections taken at multiple relative angles of rotation of the scanning apparatus.

In another arrangement a plurality of objects may be scanned. The plurality of objects and complementary objects may be disposed on the support. The objects or parts to be scanned of the objects may be positioned so that no part of any of the objects or no part to be scanned of any of the objects intersects the axis of rotation. Each object may have its centre (for example centre of mass or symmetry) displaced from the axis, for example by at least half the minimum extent of the object taken in any horizontal plane.

The plurality of objects and complementary objects may be disposed on the support so that a notional line drawn from the emitting element to the receiving element through the axis of rotation intersects two or more of the plurality of objects and complementary objects for at least a third and preferably over half of the projections. That is, the projections, which are taken at equally spaced angular positions around the axis of rotation, may cover 360 degrees of rotation, and the projections over at least 120 degrees (or 180 degrees) may then intersect one or more of the plurality of objects and complementary objects. With this density of complementary object spacing, and therefore object positioning, comes an increase in efficiency and, contrary to the established view, the inventor has found that any decline in quality due to increased scanning material is not significant.

In fact, the inventor has come to the surprising realisation that the scan quality may be improved as a larger amount of material allows for more power to be used for the scan without oversaturating the detector. Also, scanning parameters such as the power to voxel size ratio, sometimes referred to as the power to voxel ratio, are easier to adjust to desirable values when the thickness to be scanned of the objects varies less. So, positioning of the complementary objects in which the rays pass through at least one complementary object for more of the projections reduces a variation in thickness to be scanned and can make parameter setting easier. Optimising the software scanning parameters may further improve the scanning efficiency.

The plurality of objects and complementary objects may be positioned in any suitable arrangement. For example, the objects or part to be scanned of the objects and complementary objects may be positioned in a pattern on vertices of a notional regular geometric figure centred on the axis of rotation. A complementary object and object configuration (comprising an adjacent complementary object and object) may be positioned on all the three vertices (corners) of a triangle, the four vertices of a square, or the five vertices of a pentagon, or the six vertices of a hexagon etc.: any notional figure can be used.

A further plurality of objects and complementary objects may be positioned in a pattern on the vertices of a further notional regular geometric figure centred on the axis of rotation and inside the notional regular geometric figure. An object or complementary object or objects or complementary objects of the further plurality of objects may have substantially similar geometries to the plurality of complementary objects and objects or may be different from the plurality of objects and complementary objects and/or each other. Additionally or alternatively to the further plurality of complementary objects or objects, an attenuating object or objects such as a solid cylinder may be disposed in the inner region, for example centred on the axis.

The objects or part to be scanned of the objects and complementary objects may be positioned on some but not all of the vertices of the notional regular geometric figure (for example two of the four vertices of a square). In this case, all of the objects and complementary objects may be positioned to one side of a plane along which the axis of rotation extends (as seen in plan view for a vertical axis and horizontal support all the parts are to one side of a straight line drawn through the axis of rotation). Surprisingly, the inventor has found that such an asymmetrical arrangement, with half of the available space left empty, provides a better quality.

Any scannable object and any shape of scannable object may be used in the method. For example, the object may be made of metal or composite as mentioned above, or polymer or a mixture of materials. The object can be cast or moulded or machined or 3D printed (additive manufacturing), for example. The object may be a simple shape, such as a cylinder or sphere, or a more complex object such as a component for use in a machine. Hence the object may be a blade or vane or other complex manufactured part. The object may be a turbine blade. The blade may have a leading edge and a trailing edge separated by blade surfaces. In this case the blade may have any orientation with respect to the axis of rotation. However, the inventor has surprisingly found that a better image quality results when the orientation of the turbine blade positions the leading edge closer to the axis of rotation than the trailing edge (that is, a line drawn from the axis to the extremity of the leading edge is shorter than the corresponding line drawn to the extremity of the trailing edge).

Additionally, or alternatively, for a shape of turbine blade having a leading edge and a trailing edge separated by a concave blade surface opposite to a convex blade surface, the blade may be disposed on the support so that the convex blade surface is closer to the axis of rotation than the concave blade surface. Indeed, this arrangement is not limited to turbine blades, any object may have a concave surface opposite a convex surface and be correspondingly positioned. This orientation too, can provide better image quality, for example because the concave surface is facing away from the axis, which has been seen to reduce the concave wall effect. By positioning the blade with the concave side facing away from the axis, poor image contrast may be improved as the concave side may be in a brighter region of the scan. However, in some scenarios, due to complicated internals, or the leading edge having overly curved and thick geometries, the concave side may be pointed towards the axis of rotation and still be in the bright region to produce a good quality scan.

Of course, the turbine blade is not limited to a convex surface and concave surface. For example, the turbine blade may have a substantially flat blade surface opposite a concave surface or two concave surfaces opposite one another or any other combination of surfaces from known arrangements.

In a further aspect, there is provided a combination of a scanning apparatus for scanning of an object and a complementary object in the scanning apparatus (all as previously described). The scanning apparatus comprises: a support for the object, and an imaging beam emitting element and an imaging beam receiving element oppositely disposed to either side of the support. The support is rotatable relative to the emitting and receiving elements about an axis of rotation to allow creation of an image of the object from projections each taken at a different relative angle of rotation. The complementary object comprises a volume which is solid or filled with a filling material and the complementary object is configured to reduce the variation in imaging beam attenuation across the complementary object and the object at the multiple relative angles of rotation so that when the scanning apparatus is operated at the multiple relative angles of rotation it produces an image of the complementary object and object.

The invention is described in terms of particular arrangements. Other arrangements are within the scope of the claims. For example, the steps of the invention may be performed in a different order and still achieve desirable results.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Examples will now be described with reference to the accompanying drawings, which are purely schematic and not to scale, and in which.

DETAILED DESCRIPTION

Figure 1:
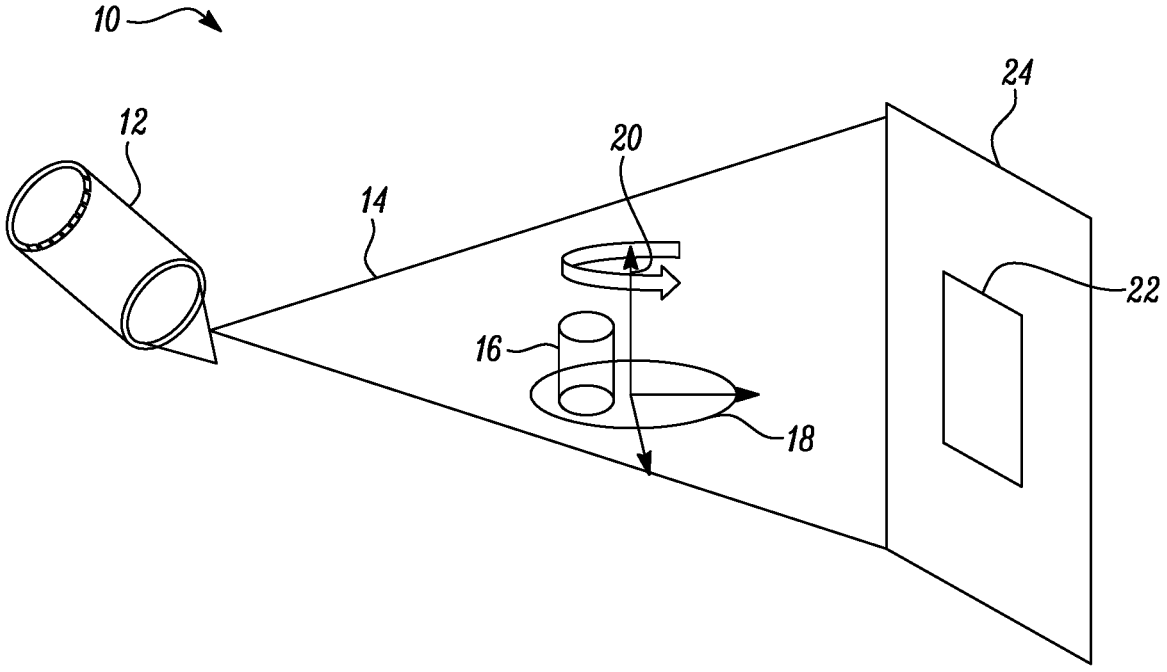
FIG. 1 is a schematic illustration showing an exemplary 3-dimensional CT scanning arrangement.

FIG. 1 illustrates the basic principles of an exemplary 3DCT scanning technique of a type which may be used in the method discussed herein. A 3D computer tomography (CT) scanning apparatus 10 may be used to perform a volumetric scan. The 3DCT scanning apparatus 10 comprises an imaging beam (i.e. x-ray), emitting element 12, a support 18 and an imaging beam (i.e. x-ray), detecting element 24. The volumetric scan may be any scan which is capable of generating a 3-dimensional (3D) image of an object 16 positioned on the support 18 and contained within an x-ray beam cone 14. The x-ray emitting element 12 generates the x-ray beam cone 14 which may comprise polychromatic x-rays (not shown). The support (usually a table on which the object or a jig is positioned) may be configured to rotate about a (usually vertical) axis of rotation 20 so that the object 16 positioned directly or indirectly on the support rotates about the axis of rotation. The object is shown here as a simple cylinder. The polychromatic x-rays penetrate the object and are received by the x-ray detecting element. A volumetric x-ray image 22 of the object is formed from the output of the x-ray detecting element. For example, the output may be processed in a manner known per se to form one or more two-dimensional images in the form of "slices" (cross-sections) through the object.

As will be appreciated, in order to capture complete slices through the relevant part of the object via the type of technique described above, the part of the object being scanned should remain entirely within the x-ray beam cone whilst it is rotated.

Figure 2:
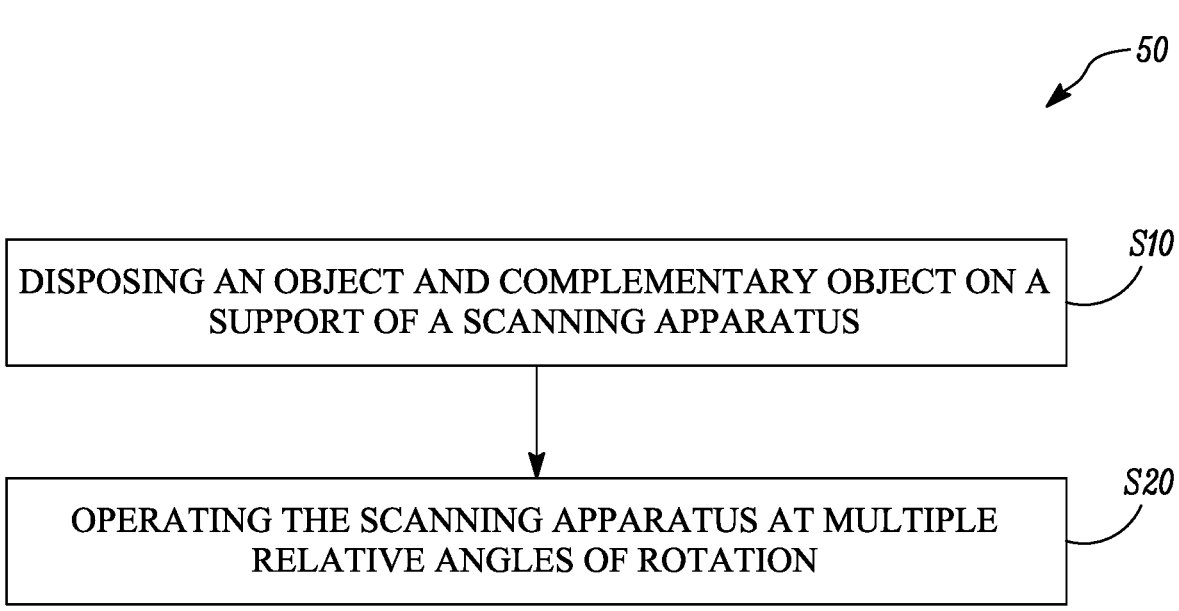
FIG. 2 is a flow chart showing steps of a method for scanning of an object or a plurality of objects in a scanning apparatus.

FIG. 2 is a flow chart showing steps of a method 50 for scanning of an object in a scanning apparatus. In step S10 the object and complementary object are manually, for example, disposed on a support 18 of a scanning apparatus 10.

A volume of the complementary object may be solid (a solid volume) or may be filled with a filling material such as a powder. For example, the complementary object may be made from a solid material or may have walls extending from a base forming a cavity which can accept a filling material.

Figure 3:
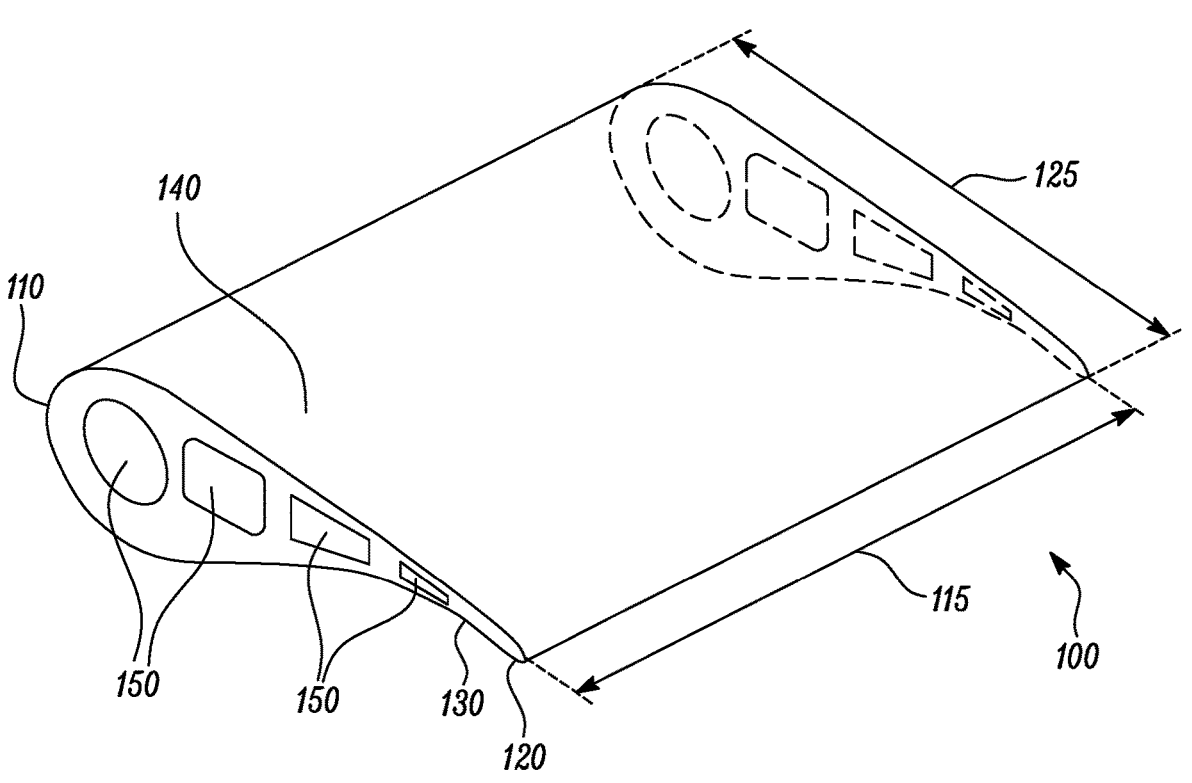
FIG. 3 is a diagonal view of an aerofoil section of a turbine blade.

The filling material or the solid volume may be made from the same material as the object. There may be a border region between the object and the solid volume or filling material. This region may have a different, for example lower, imaging beam attenuation than the object (formed by, for example, a material with a lower density than the object or an air gap or a combination of both). Before placing the object relative to the complementary object, the object may be covered with a film or coating or wall or sleeve to protect it from directly contacting the filling material or solid volume. The object may be a turbine blade 100, for example that which is depicted in FIG. 3. It will be appreciated that the object could, however, take any form. Further, objects with substantially similar or identical construction, such as turbine blades, may be disposed on the support with one or more complementary objects.

The complementary object is configured to reduce the variation in imaging beam attenuation across the complementary object and the object or the part to be scanned of the object at the multiple relative angles of rotation. The complementary object and object may be suitably fixed to the support, for example they may be held in a jig and so indirectly positioned on the support. The scanning apparatus may be, for example, substantially similar in construction to the 3DCT scanning apparatus 10.

For scanning a plurality of objects, the objects and complementary object(s) may be disposed in a pattern around the axis of rotation with no part of them intersecting the axis. The objects may be orientated to form a pattern with rotational symmetry around the axis of rotation.

In S20 the scanning apparatus is operated at multiple relative angles of rotation to produce an image of the object. A projection or projections may be taken at each angle around a complete 360 degrees and a complete volumetric representation of the object disposed relative to the complementary object may be obtained from a set of equally angularly spaced projections. The volumetric representation may comprise a plurality of voxels, with each voxel representing a sub-volume of the image. Subsequently the image can be viewed in cross sections, as in known arrangements.

FIG. 3 shows a diagonal view of an aerofoil section of a turbine blade 100. Other parts of the blade, such as a mounting section are less relevant and not shown. The turbine blade in this arrangement is formed from a metal material which may be cast metal, but the teaching herein can be applied to objects of any scannable material.

The turbine blade comprises a leading edge 110, a trailing edge 120, and blade surfaces between these edges, such as a concave surface 130 and a convex surface 140. The concave surface extends in an inwardly curved shape between the leading edge and the trailing edge. The convex surface of the turbine blade extends in a similar manner to the concave surface, but with an outward curve and is opposite to the concave surface. There may be void regions 150 (without the material). For clarity only, exemplary voids are illustrated in FIG. 3. There are four voids illustrated, although it will be apparent to the skilled reader that more or fewer voids may be present.

Sometimes only a small region of a large object is scanned. For example, the aerofoil section (rather than any essentially orthogonal mounting section) is generally of primary interest when CT scanning turbine blades, and in particular the internal structure of the aerofoil section is to be investigated. The aerofoil section may, for example, be considered as the part of interest of the object. The turbine blade may be disposed on the support so that the mounting section of the blade intersects the axis of rotation, but the aerofoil section does not. That is, the part of the object to be scanned does not intercept the axis of rotation. As a further example, an object in the shape of the letter 'L' may be disposed on the support so that only the vertical part being scanned is offset from the axis, but the bottom horizontal part may still intercept the axis of rotation.

As will be appreciated by those of skill in the art, the turbine blade comprises an elongate aerofoil section (part) of the turbine blade having a span 115. Further, a chord 125 may be drawn between the extremities of the leading edge and the trailing edge.

Figure 4A:
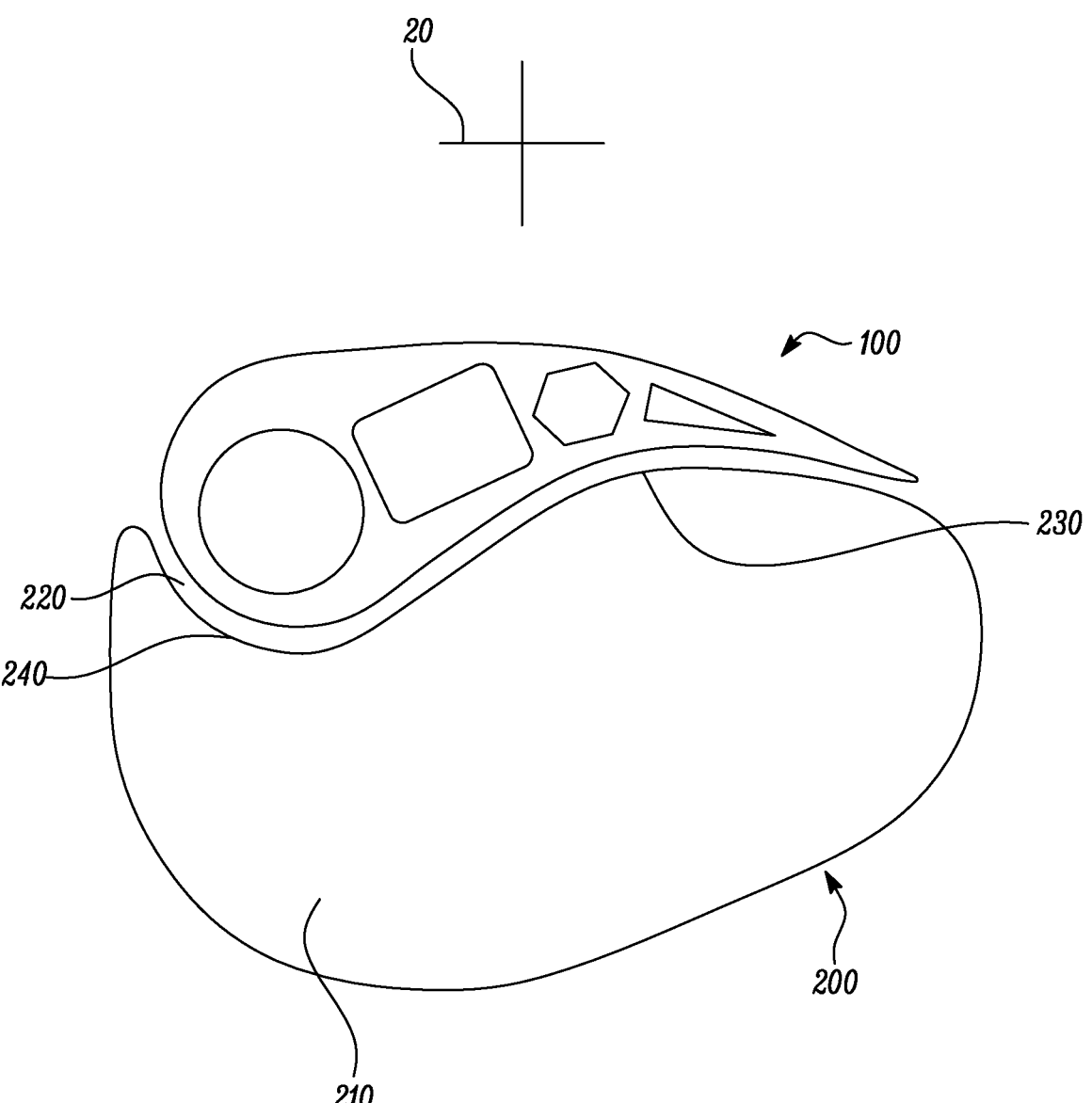
FIG. 4a is a sectional plan view of a turbine blade positioned adjacent a complementary object and disposed relative to an axis of rotation of a support in a CT scanning apparatus.

FIG. 4a shows a sectional view of a turbine blade disposed adjacent to a complementary object 200. The axis of rotation 20 extends into the plane of the page and is shown as a cross in FIG. 4a. The turbine blade 100 and complementary object are placed within the scanning apparatus in a favourable orientation relative to one another (with an air gap between them). The surface of the complementary object adjacent the surface of the turbine blade forms a complementary shape to the turbine blade surface. That is, for example, the complementary object has a convex surface 230 to counter the concave surface 130 of the turbine blade and has a concave surface 240 to complement a convex surface of the turbine blade. The surface of the complementary object adjacent the turbine blade may complement the surface of the turbine blade so that if the complementary object and turbine blade were to be interconnected there would be no air gap at any point between the surfaces. That is, the facing surfaces of the object and the complementary object are equally spaced across their full extent. Indeed, the turbine blade and complementary object may be disposed so that their surfaces are in direct contact, or they may be separated by a border region 220, made from, for example, a polymer film and/or an air gap.

It will be appreciated that, although object cross sections are shown in the Figures, the complementary object and object configuration is of course, 3-dimensional. The geometry of the object may vary along its extent and the geometry of the complementary object will vary to complement the object accordingly. That is, the 3D object to be scanned may be formed by simply extruding the 2D cross section or may instead have a varied complex geometry across its longitudinal axis (in this case the axis extending orthogonally to the plan view cross section, usually in the Z direction, or vertically). In either case, the complementary object may have a shape which complements a varying cross section of an object along the Z-axis.

Disposing the turbine blade relative to the complementary object in this manner may be considered as making up a configuration. The inventor found that the highest quality scans were produced when the resultant geometry of the configuration approximated a cylinder. Alternatively, equally high scan quality was achieved when the configuration formed a hollow cylinder, sphere or hollow sphere. That is, the highest scan quality was achieved when the resultant geometry (or shape) of the configuration had a circular or substantially circular or annulus cross-section (taken in a plane connecting the emitting and receiving elements of the scanning apparatus). The configuration results in a high scan quality as the variation in combined material thickness to be penetrated by the scanner is reduced for multiple projections.

Thus, variation in material thickness, that is thin and thick regions of the turbine blade, are averaged out, or reduced, using the complementary object. Further, as the complementary object fills in the concave wall 130 of the turbine blade, artifacts due to, for example, x-rays scattering off the concave surface may be reduced (i.e. there is a reduction in artifacts caused by the concave wall effect) and regions of the object where x-rays may have been concentrated and scattered may be covered by the complementary object, thus reducing scattering and beam hardening effects. The combined configuration of the object and complementary object may therefore reduce the variation in imaging beam attenuation across the object and complementary object for projections taken at multiple relative angles of rotation of the scanning apparatus.

Figure 4B:
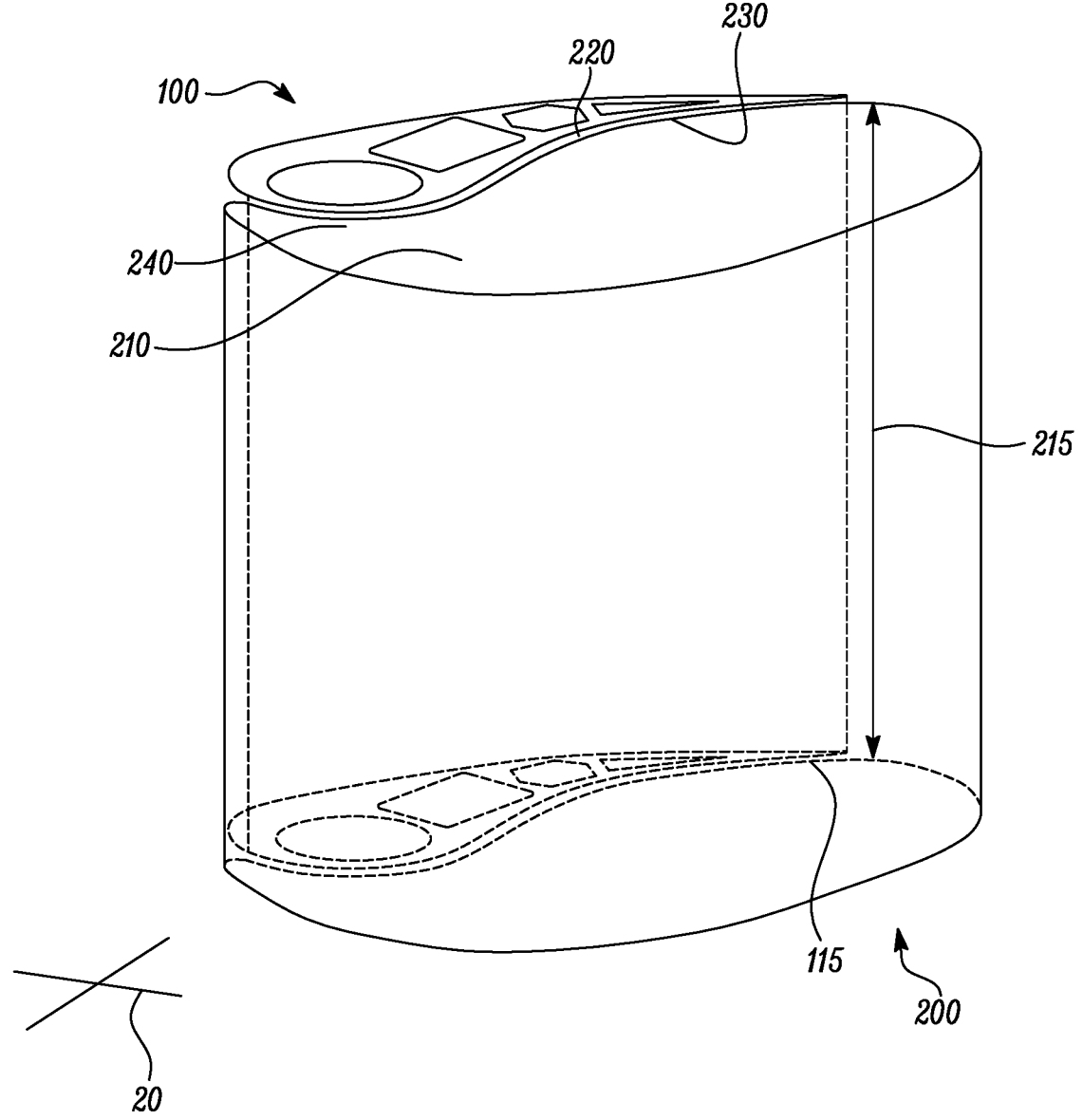
FIG. 4b is a diagonal view of a turbine blade and complementary object disposed relative to an axis of rotation of a support in a CT scanning apparatus.

FIG. 4b shows a 3-dimensional (3D) representation of the turbine blade 100 and complementary object 200. A longitudinal axis of a turbine blade can be defined, using the turbine blade in FIG. 3, as being parallel to the span 115 of the turbine blade and extending along the span of the aerofoil section. In FIGS. 4 and 4a the longitudinal axis is substantially parallel to the (usually vertical) axis of rotation 20. The turbine blade, or any other object, may, however, be orientated to form an angle between the longitudinal axis of the blade and the axis of rotation. Disposing the turbine blade so that its longitudinal axis is at an angle to the axis of rotation may improve image quality and contrast of the 3DCT scan. As will be understood, the turbine blade is used by way of example only and any other object may be scanned. The longitudinal axis of the turbine blade is illustrated as substantially parallel to the axis of rotation by way of example only. A longitudinal axis can be defined in a similar manner for a different object.

As will be appreciated, when an object and the complementary object are positioned in this configuration on the support, the support rotates about the axis of rotation and the two objects will rotate together, in their relative orientation as a whole around the axis of rotation within the x-ray beam cone, in the manner described above with reference to FIG. 1. The axis may, for example, extend centrally between the object and complementary object, so that they are equally offset from it, or it may extend in any other position. The object and the complementary object are CT scanned simultaneously to produce sectional slices of both the object and complementary object at the same time and the object may be separated and analysed in postprocessing.

In this arrangement the complementary object has a solid volume 210. That is, the complementary object may be made from one or more solid material, for example metal or polymer. In another arrangement the complementary object has a cavity which may accept a filling material. For example, the complementary object may be formed of a flexible membrane with a filling material inside, or maybe a solid, a collection of solid parts or a combination of such options.

The solid volume 210 (or filling material) may be chosen so that is has the same imaging beam attenuation as the object. For example, the solid volume may be made of the same material as the object. In an arrangement where the object is a turbine blade made from a cast metal, the solid volume (or filling material which may be in the form of a powder) may be made from the cast metal. Here, the material of the solid volume (or filling material) is matched with the material of the object so that the solid volume and object have the same imaging beam attenuation. That is, as the solid volume and object are made from the same material, they have the same attenuation coefficient. Hence, it will be appreciated that any material may be used for the solid volume in this example so long as it has a similar, or substantially similar, imaging beam attenuation as the object. Indeed, the same applies if a filling material is used instead of a solid volume.

In FIGS. 4a and 4b, the object and complementary object are shown as being disposed totally offset from the axis of rotation 20. As will be appreciated, this is an example only and the complementary object, object and/or configuration of complementary object and object may be disposed so that their respective centre of symmetries or centres of mass are centred on the axis of rotation. Alternatively, the complementary object (or object) may be disposed offset from the axis of rotation but with the axis of rotation still contained within the complementary object's (or object's) walls. The inventors surprisingly found that disposing an object (or the part of the object to be scanned) with a complementary object offset from the axis of rotation of the support of a 3DCT scanning apparatus may improve image quality and contrast of the CT scan. Positioning the complementary object and object so that they are offset from the axis of rotation may also reduce the concave wall effect. Further, disposing the complementary object and/or object so that their longitudinal axes are at an angle to the axis of rotation may improve image quality and contrast of the 3DCT scan.

Figure 5:
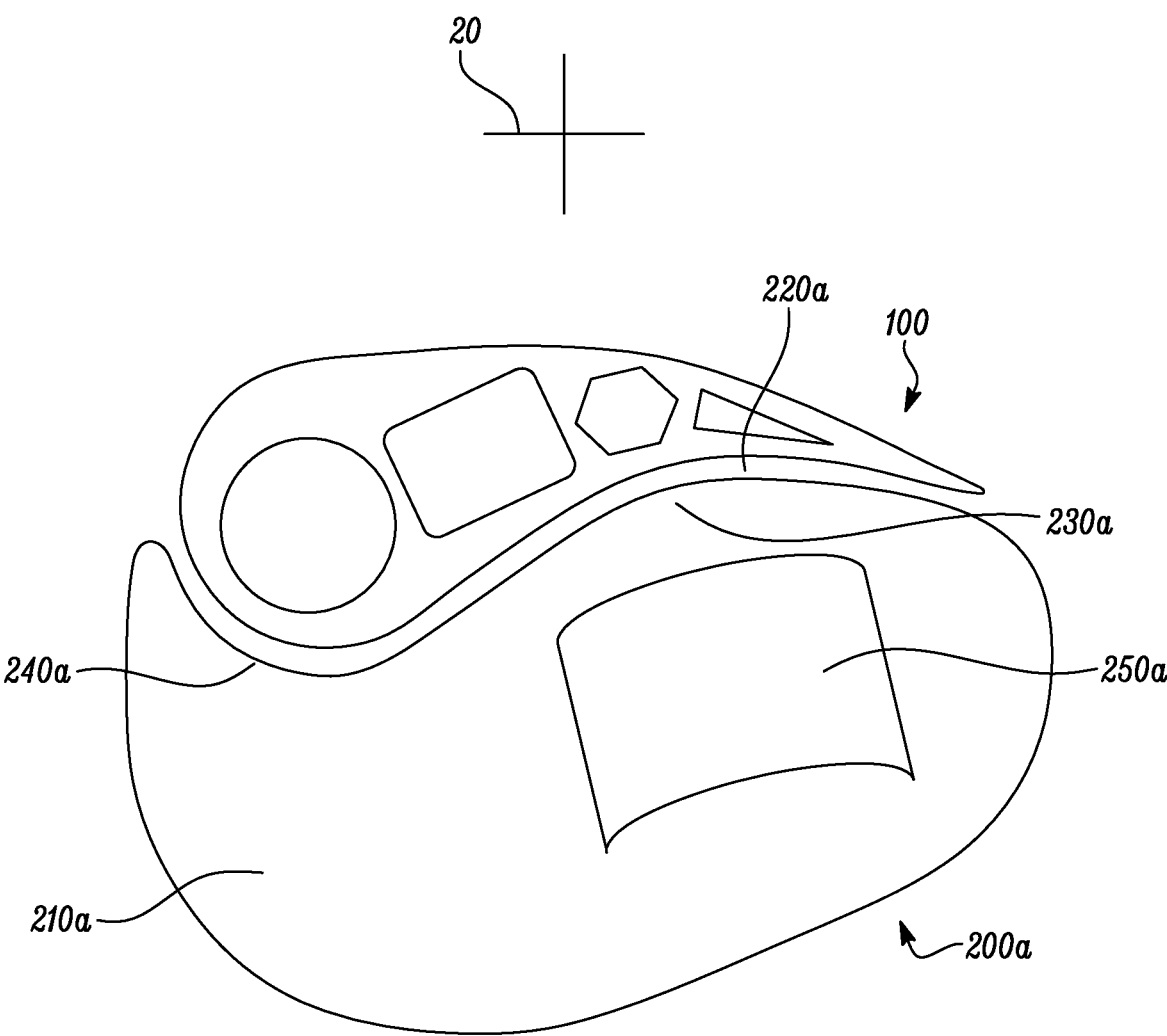
FIG. 5 is another sectional plan view of a turbine blade positioned adjacent a complementary object and disposed relative to an axis of rotation of a support in a CT scanning apparatus.

FIG. 5 shows another arrangement, similar to FIG. 4a (that is, the reference numerals 200a to 240a correspond to the reference numerals 200 to 240 as in FIG. 4*a*) but with a complementary void 250*a* to complement the contours and/ or voids of the object or part of the object to be scanned. The complementary void may be an air gap, filled with a filling material, either partially or totally, or filled with a solid material, or any combination of these. The complementary void may reduce the variation in imaging beam attenuation for multiple relative angles of rotation as, for example, the complementary void may be positioned opposite the thin trailing edge of an object, in this case the turbine blade 100. Additionally or alternatively, the complementary void made be positioned adjacent voids 150 in the object. The complementary void may be filled with a relatively dense material so that when x-rays penetrate it, they are attenuated more than, for example, a less dense material the object may be made from. The variation in imaging beam attenuation for projections taken at multiple relative angles of rotation may therefore be reduced. This may improve image quality as a higher image contrast may be obtained at the object's surface.

The complementary void made be filled, using for example the filling material or a solid volume of material, with the same material or comparable materials as the object to be scanned. If a part of the object has an inclusion made of a denser material than the rest of the object, the complementary object may have a similar insert (of lower density material) or void to compensate for the higher beam attenuation properties of the dense material. The complementary void may reduce the material path length, and/or imaging beam attenuation, across the complementary object and object. Additionally or alternatively, the thickness of the complementary object may compensate for a dense insert in the object. The combined configuration of the object and complementary object may therefore reduce the variation in imaging beam attenuation across the object and complementary object for projections taken at multiple relative angles of rotation of the scanning apparatus.

Figure 6:
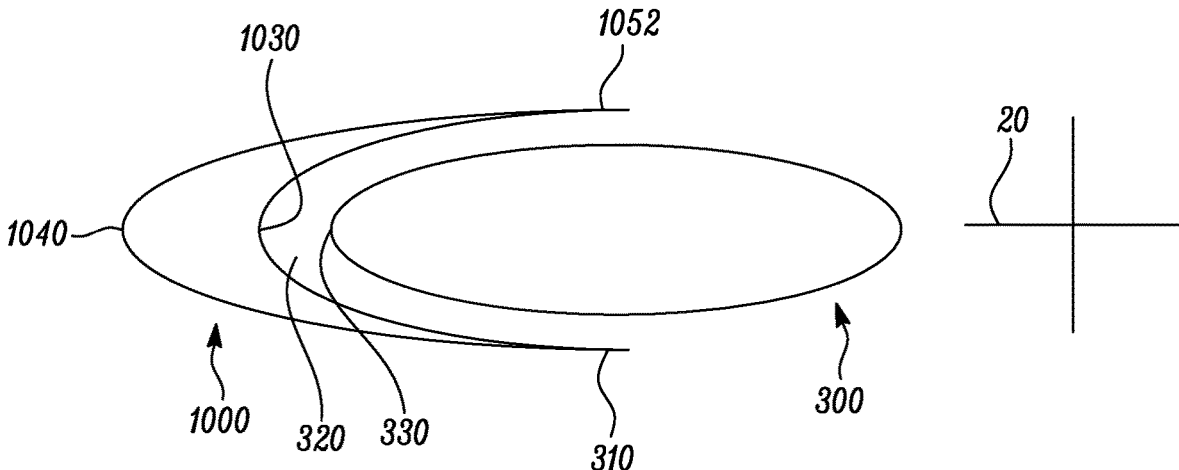
FIG. 6 is a sectional plan view of an object positioned adjacent a complementary object, the complementary object in the form of an elliptical cylinder.

FIG. 6 shows a cross section of an object 1000 with a concave surface 1030 and convex surface 1040 bound by two relatively thin edges 1050-1052. The convex surface extends outwardly between the extremities of the two thin edges and the concave surface extends in a similar manner to the convex surface, but with an inward curve and is opposite to the convex surface. An elliptical complementary object 300, that is a complementary object with an elliptical cross section, is positioned adjacent the concave surface of the object so that the object partially surrounds the complementary object. That is, a convex surface 330 of the complementary object 300 is adjacent the concave surface of the object. There is a border region 320 between the object and complementary object. The complementary object is shown to be made from a single solid material 310 but may, of course, be made from multiple solid materials and/or filling materials.

By introducing a complementary object, the variation in material path length for the combined object and complementary object may be reduced for multiple relative angles of rotation of the scanning apparatus. The variation in imaging beam attenuation across the complementary object and object may be reduced, leading to improved image contrast and quality. Regions, for example concave surfaces, of the object where x-rays may be concentrated and scattered may be filled by the complementary object, thus reducing scattering and beam hardening effects. The complementary object disposed adjacent and/or partially surrounded by the object fills in, in this arrangement, the concave surface of the object and therefore provides a combined shape closer to the "ideal" circular, or hollow circle, cross-section for scanning in which thickness of material to be penetrated is constant for all the projections.

The combined shape of the complementary object and object may be, for example, cylindrical or form a hollow cylinder or be spherical depending on the relative motion of the scanning elements in the scanning apparatus. This 'ideal' shape may further improve the image quality and contrast of the scan. Further, the 3DCT scanning parameters may be optimised, hence improving scanning efficiency.

In FIG. 6 the complementary object is shown proximal to the axis of rotation and the object is distal to the axis of rotation. That is, the complementary object is disposed closer to the axis of rotation than the object to be scanned. The inventor surprisingly found that by disposing the complementary object and object in such a manner the scan quality may be improved. The complementary object may be placed in the "darker" region of the scan while the object is in the "brighter" outer region of the support. The additional material in the inner region of the support means the power of the scanner may be adjusted to levels where previously image contrast would be reduced in part of the object. The adjusted power may result in a relatively constant brightness region in the outer region of the support, leading to an even contrast across the object and hence an improvement in scan quality. Of course, other scanning parameters may be adjusted and optimised to improve the quality and efficiency of scanning the plurality of objects.

In another arrangement the object and complementary object may be disposed so that the convex edge 1040 of the object is closer to the axis of rotation while maintaining the relative orientation of the object and complementary object. This may be formed by, for example, rotating the complementary object and object, as shown in FIG. 6, by 180 degrees about a central point, for example a centre of symmetry or centre of mass of the complementary object and object, passing through their plan view cross-sections. Disposing the object with the thicker edge of the blade closer to the axis of rotation than the thinner edges can be helpful in countering the concave wall effect as the trailing edges are in a "brighter area" of the x-ray scan, away from a central "dark spot" on the axis. In general, an object may have a geometry with a thin region that normally has a darker or lower contrast when scanned. By keeping the object in an orientation where such a geometric element is in the brighter outer half of the scan, the difference in contrast between inner and outer or thicker and thinner regions may be reduced.

Figure 14:
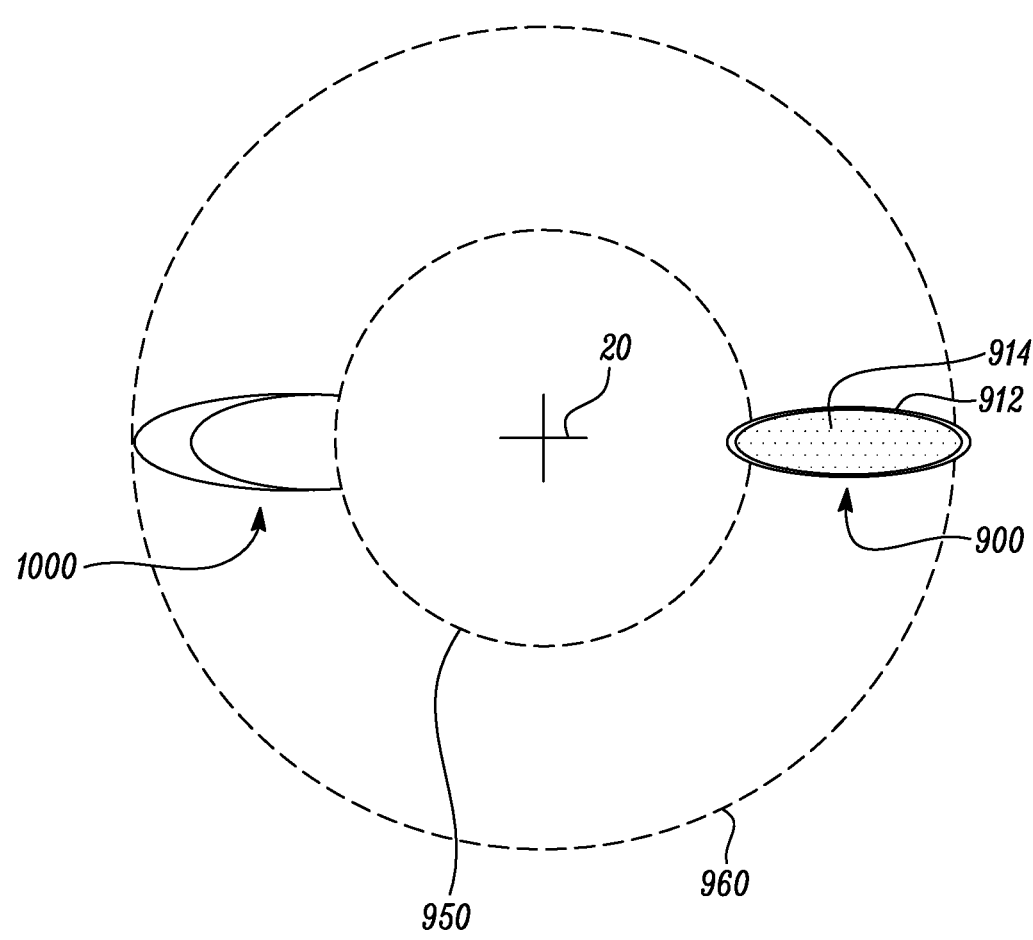
FIG. 14 is a sectional plan view of the object described in FIG. 6 disposed spaced apart from a complementary object in the form of an elliptical cylinder.

In another arrangement, the object may be orientated to keep the concave and convex surfaces equidistant from the axis of rotation to provide an even image contrast between the surfaces. It will be appreciated that the optimum orientation will be affected by the curvature of the surfaces. Further, as depicted in FIG. 14, the object and complementary object may be disposed on opposite sides of the scanning support.

It will be appreciated that this arrangement is not limited to simple geometric shapes. Of course, any complex objects, for example turbine blades or any other manufactured parts, may be configured with a complementary object to provide a constant, or nearly constant, thickness of material for all projections.

Figure 7:
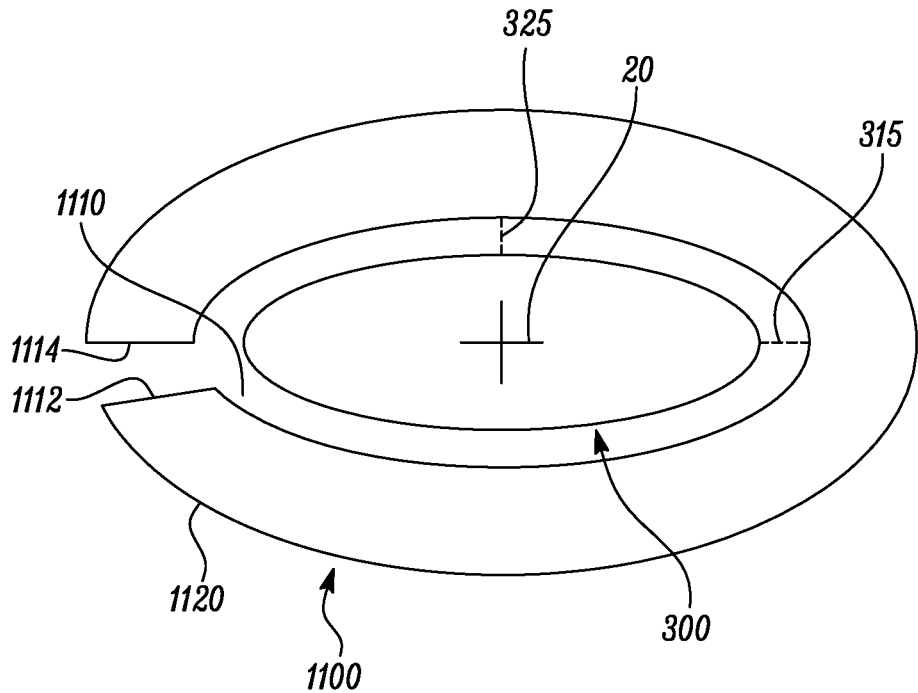
FIG. 7 is a sectional plan view of an object with a partial elliptical cross section and a complementary object positioned within the object.

FIG. 7 shows a complementary object, substantially similar in construction to the elliptical complementary object 400, placed within the interior of a partial elliptical object 1100. The partial elliptical object may be considered as an object with a cross-section forming a partial elliptical ring, or elliptical annulus with two open ends 1112-1114. In the sectional plan view shown in the figure, the partial elliptical object does not completely surround the complementary object.

The cross section of the object is such that there is constant thickness between an inner surface 1100 and an outer surface 1120 of the object. The complementary object 300 is complementary in the sense that it too has an elliptical cross section and, in one arrangement, the facing surfaces of the object and complementary object may be equally spaced across their full extent. That is, the distance between adjacent vertices of the complementary object's elliptical cross section and the inner surface of the object may be the same as the distance between covertices of the complementary object and inner surface of the object. For example, a vertex distance 315 is equal to a covertex distance 325.

Contrary to known teachings, the inventor surprisingly found that introducing more material for the x-rays to penetrate may improve the scan quality of the object. Filling the cavity of, or space within, the object with the complementary object provides a more even material thickness across the complementary object and object configuration. Hence, the variation in imaging beam attenuation across the object and complementary object may be reduced at the multiple relative angles of rotation of the scanning apparatus.

The inventor additionally found that the power of the scanner may be adjusted to levels where previously image contrast would be reduced in part of the object. As the complementary object provides a thicker material for the x-ray to penetrate, the power of the emitting element may be increased to levels where previously the contrast across thin regions of the object would be too low to produce a sufficient quality scan. The adjusted power may result in a relatively even contrast across the object and hence an improvement in scan quality. Of course, other scanning parameters may be adjusted and optimised to improve the quality and efficiency of scanning the plurality of objects. As shown in FIG. 7, the complementary object may be placed in the "darker" inner region of the scan and the object in the "brighter" outer region. This may improve scan quality as the object is placed in a region where the x-rays may be attenuated evenly across the extent of the object.

As for all arrangements disclosed herein, the complementary object may be a solid volume or may have a cavity which may be filled by a filling material such as a powder or grain. The complementary object and object may be disposed so that their surfaces are in direct contact, or they may be separated by a border region, made from, for example, a polymer film or an air gap. The complementary object may be wrapped or covered, completely or partially, in a film or sleeve to separate it from the object. Additionally or alternatively, the object may be wrapped or covered in the film or sleeve. The film or sleeve may provide a region between the surface of the complementary object and the object with an imaging beam attenuation different from the object's imaging beam attenuation. For example, a polymer film may have a lower imaging beam attenuation (or lower density) than a metal object. Thus, there will be a contrast at the region-object boundary of the scan. This may aid in the identification of the object in the image scan. It may be that the surface or walls of the complementary object are made from a material with a different imaging beam attenuation than the object, thus providing a region of image contrast between the object and complementary object.

Figure 8:
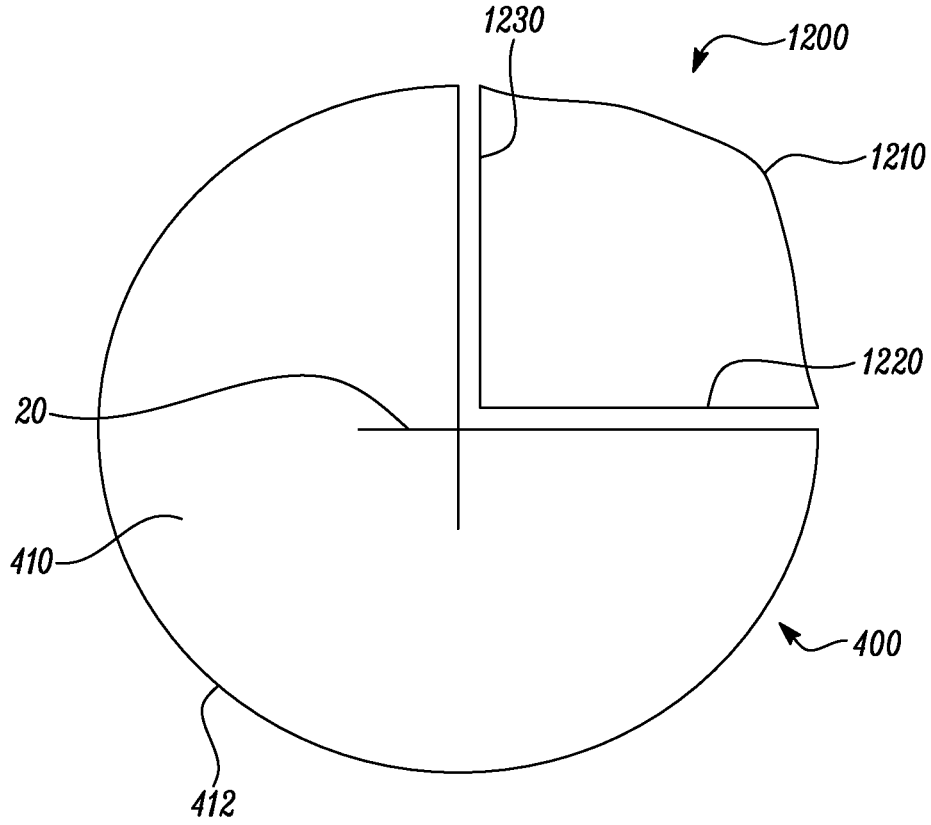
FIG. 8 is a sectional view of an object with a cross section in the form of a minor sector, positioned adjacent a complementary object with a major sector cross section.

FIG. 8 shows an object 1200 with a cross section in an approximate form of a minor sector of a circle, along with a complementary object 400 made from a solid volume 410 and with a cross section forming a major sector of the same circle. The object and complementary object are disposed so that their combined configuration forms a circular, or substantially circular cross section. The object cross section may be formed from two surface 1220-1230 meeting at one vertex and connected by a minor arc 1210. Correspondingly, the complementary object's cross section may be formed from two connecting surfaces and a major arc 412.

It will be appreciated that the meaning of an approximate form of a minor sector is that the surface 1210 of the object facing away from the complementary object 400 is curved but may have irregularities, as shown. In this arrangement, the object and complementary object are shown disposed on a support relative to the axis of rotation 20.

A problem the inventors identified when scanning objects with variable thickness across their extent was poor contrast and image quality in either the thinner or thicker regions of the object as different scanning parameters are suitable for the different material thicknesses. Hence, by introducing a complementary object, the variation in material path length may be reduced for multiple relative angles of rotation of the scanning apparatus. The variation in imaging beam attenuation across the complementary object and object may be reduced, leading to improved image contrast and quality.

Regions of the object where x-rays may be concentrated and scattered may be filled by the complementary object, thus reducing scattering and beam hardening effects. The complementary object disposed adjacent or opposite the object may provide a shape closer to the "ideal" circular cross-section for scanning in which thickness of material to be penetrated is constant for all the projections. The combined shape of the complementary object may be, for example, a cylindrical or spherical, and may be hollow, depending on the relative motion of the scanning elements in the scanning apparatus. This 'ideal' shape may further improve the image quality and contrast of the scan. Further, the 3DCT scanning parameters may be optimised, hence improving scanning efficiency.

Figure 9:
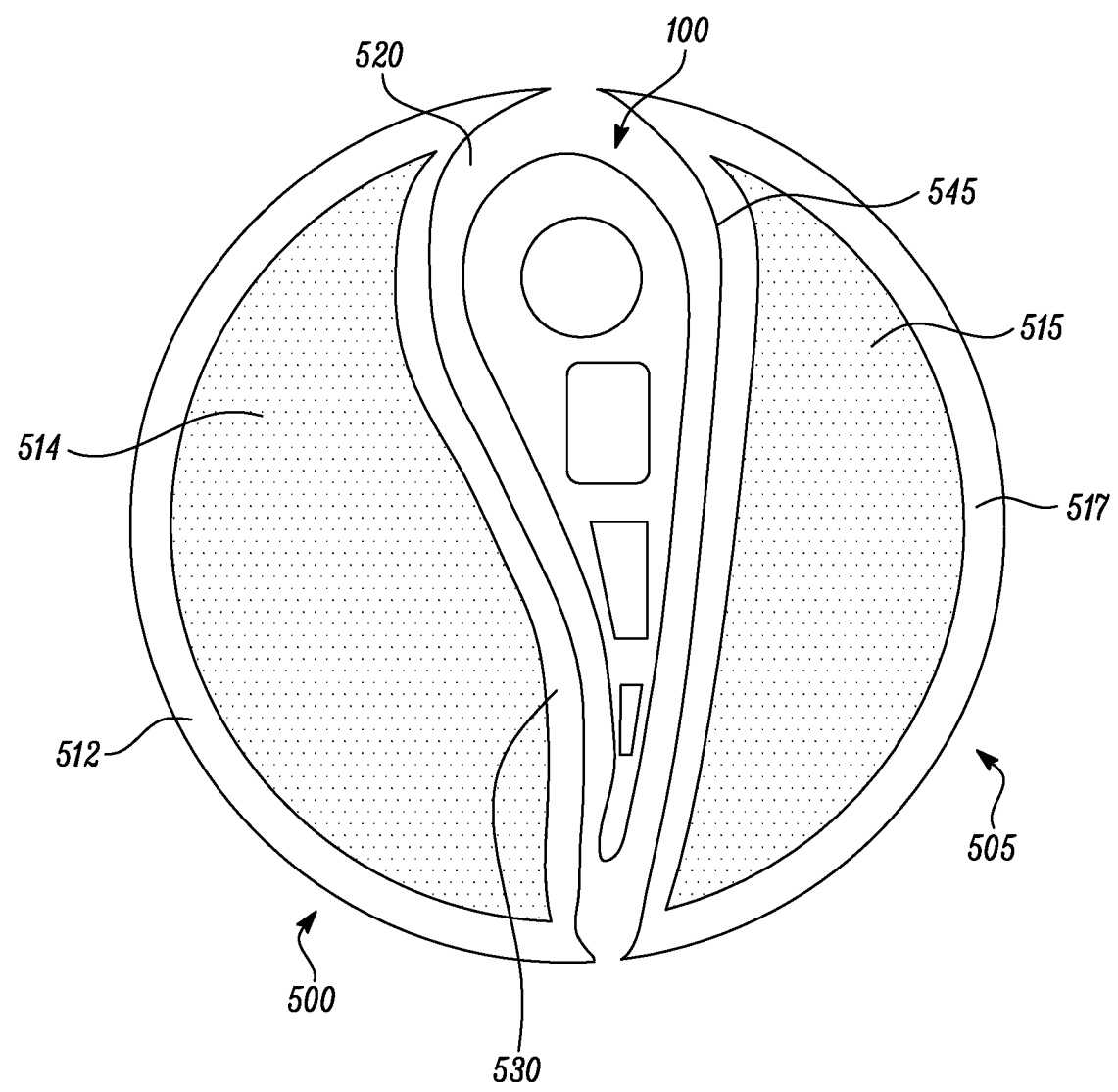
FIG. 9 is a sectional plan view of a turbine blade positioned in between two complementary objects and disposed relative to an axis of rotation of a support in a CT scanning apparatus.

FIG. 9 shows the turbine blade 100 disposed between two complementary objects 500-505. The surfaces of the complementary objects adjacent the surfaces of the turbine blade form a complementary shape to the turbine blade surfaces. For example, a first complementary object 500 adjacent the concave surface 130 of the turbine blade has a convex surface 530 and a second complementary object 505 adjacent the convex surface 140 of the turbine blade has a concave surface 545. The surfaces of the complementary objects adjacent the turbine blade may be such that if the complementary objects and turbine blades were to be interconnected there would be no air gap at any point between the surfaces. Indeed, the turbine blade and complementary object may be disposed so that their surfaces are in direct contact, or they may be separated by a border region 520, made from, for example, a polymer film or an air gap.

A problem the inventors identified when scanning individual turbine blades with an aerofoil cross-section was poor contrast and image quality in either the thinner trailing edge or the thicker leading edge, because different scanning parameters are suitable for the different thicknesses in these two different blade areas. Indeed, this also applied to other objects with uneven thickness across their length). Averaging out the material thickness of an object by placing it in between or adjacent complementary objects, may reduce artifacts caused by the concave wall effect. Regions of the object where x-rays may have been concentrated and scattered may be filled by the complementary object, thus reducing scattering and beam hardening effects. The complementary objects disposed around the object may provide a shape closer to the "ideal" circular cross-section for scanning in which thickness of material to be penetrated is constant for all the projections. The combined shape of the complementary objects and object may be, for example, a cylindrical or spherical depending on the relative motion of the scanning elements in the scanning apparatus. This 'ideal' shape may further improve the image quality and contrast of the scan. Further, the 3DCT scanning parameters may be optimised, hence improving scanning efficiency.

In this arrangement the complementary objects have a hollow cavity which may be filled by a filling material 514-515. For example, the complementary object may be formed of walls 512-517 with granular material inside. The walls, or flexible membrane, of the complementary object may be made from a polymer material; however, it is understood that any material, for example with a relatively low x-ray attenuation coefficient may be suitable. The filling material may be a powder made from the same material as the object. In an arrangement where the object is a turbine blade made from a cast metal, the powder may, for example, be made from the cast metal. The material of the powder may be matched with the material of the object so that the powder and object have the same imaging beam attenuation. That is, as the powder and object are made from the same material, they have the same attenuation coefficient. Hence, it will be appreciated that any material may be used for the powder so long as it has a similar, or substantially similar, imaging beam attenuation as the object disposed adjacent the complementary object. Indeed, the same applies for another arrangement in which the complementary objects are formed from solid volumes instead of using a filling material.

As in previous arrangements, there may be a border region 520, for example an air gap, between the complementary object and the object. Additionally or alternatively, the object may be covered by a polymer film (not shown) to prevent contact between the object and the complementary object and/or the object may be wrapped or placed within a 'sleeve-like' wall or cooperating walls (preferably contiguous with the object surfaces) to separate it from the surface of the complementary object. The film may provide a region between the surface of the complementary object and the object with an imaging beam attenuation different from the object's imaging beam attenuation. For example, the polymer film may have a lower imaging beam attenuation (or lower density) than the object. Thus, there will be a contrast at the region-object boundary of the scan. This may aid in the identification of the object in the image scan.

Figure 10:
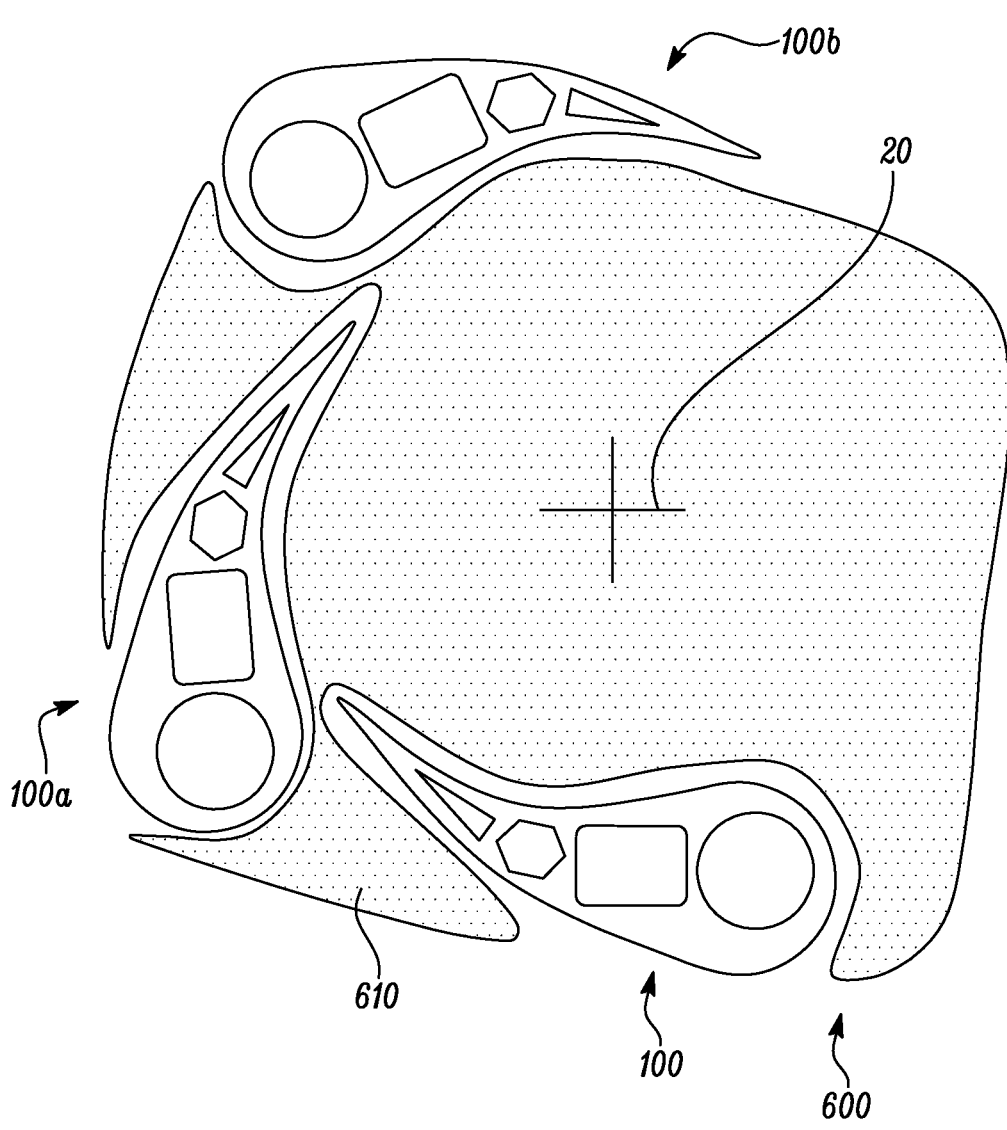
FIG. 10 is a sectional plan view of three turbine blades placed relative to a complementary object and disposed relative to an axis of rotation of a support in a CT scanning apparatus.

FIG. 10 shows a plurality of objects, in this case turbine blades 100-110b with substantially similar constructions to the turbine blade in FIG. 3, disposed on the support with a complementary object 600. The turbine blades and complementary object are disposed relative to axis of rotation 20, and relative to each other in a favourable configuration.

A problem the inventors identified when scanning individual turbine blades with an aerofoil cross-section was poor contrast and image quality in either the thinner trailing edge or the thicker leading edge, because different scanning parameters are suitable for the different thicknesses in these two different blade areas. Also, the concave surface and convex blade surfaces can lead to scanning issues. Thus, optimising the 3DCT scan parameters for turbine blade's aerofoil forms (and indeed other objects with uneven thickness across their length) is a problem in the known arrangements and may lead to scan artifacts such as beam hardening and the concave wall effect.

The inventor has come to the realisation that by evening out the material thickness, by disposing an object or plurality of objects with a complementary object, the image quality and contrast of the 3DCT scan may be improved as, for example, artifacts from the 3DCT may be reduced or eliminated. Further, contrary to the established view that an increase in dense material to be scanned reduces scan quality, the inventor has found that any decline in quality is not significant. In fact, the inventor has come to the surprising realisation that the scan quality may be improved as a larger amount of material allows for more power to be used for the scan without oversaturating the detector. Also, scanning parameters such as the power to voxel size ratio, sometimes referred to as the power to voxel ratio, are easier to adjust to desirable values when the thickness to be scanned of the objects varies less. Optimising the software scanning parameters may further improve the scanning efficiency.

As shown in FIG. 10, the centre of the complementary object (that is, for example, the centre of mass or centre of symmetry) may be placed on the axis of rotation 20 of the support. The inventor found that disposing the turbine blades and complementary object on the support so that the turbine blades are displaced from the centre of rotation can be helpful in countering the beam hardening effect. Orientating the blades to keep the concave and convex surfaces in the same "brightness band", and in the outer "brighter area" of the x-ray scan, away from the central "dark spot" provides an even image contrast between the surfaces, thus improving scan quality. As shown in FIG. 10, the turbine blades are orientated with the leading edge of one blade adjacent to the trailing edge of another to form a part cylindrical shape. Keeping the turbine blades equidistant from the centre of rotation in an orientation which forms this "virtual" or "hollow" cylinder provides even image contrast across all blades, therefore improving scan quality.

The complementary object in FIG. 10 is shown to have a solid centre. It will be appreciated that the complementary object may have voids (not shown) to complement the objects. Additionally, the centre of the complementary object may be hollow so that the configuration formed by the complementary object and object(s) form a (close to) hollow circular, or annulus, cross section.

In this arrangement the plurality of turbine blades all have substantially similar constructions to the turbine blade in FIG. 3 and are hence made of the same material, for example, cast metal. The solid volume 610 of the complementary object may therefore be made of the same material as the turbine blades or may be made of a material with substantially the same imaging beam attenuation as the turbine blades. The same applies for another arrangement in which the complementary object is formed from wall extending from a base and so may contain a filling material. In that case the filling material may be made from the same material as the turbine blades, for example.

As for any arrangement in which the objects are made from different materials, the filling material or solid volume may be chosen to be similar, or identical, in its imaging beam attenuation properties as one (or more) of the objects. That is, the filling material or solid volume may be made from the same material as one or more of the objects. Alternatively, the imaging beam attenuation (or linear attenuation coefficient) of the filling material or solid volume may be chosen so that it is in the range of the maximum imaging beam attenuation and minimum attenuation of the objects. For example, the attenuation strength of the filling material or solid volume may be an average of the attenuation strengths of the objects. Of course, the solid volume or filling material may have an imaging beam attenuation which is higher or lower than any of the object.

In this arrangement, three turbine blades are shown along with the complementary object. It will be understood that more or fewer turbine blades may be scanned, and the complementary object may have more or fewer inserts to accommodate the turbine blades.

Further, it will be appreciated that any object may be scanned along with the complementary object and turbine blades are used by way of example only. A complete volumetric representation of the three blades (and complementary object) may be obtained by acquiring a set of CT slices. That is, the three blades are CT scanned simultaneously to produce sectional slices of all three blades at the same time. 3DCT scanning efficiency of objects may be improved as a plurality of objects may be scanned simultaneously.

Figure 11:
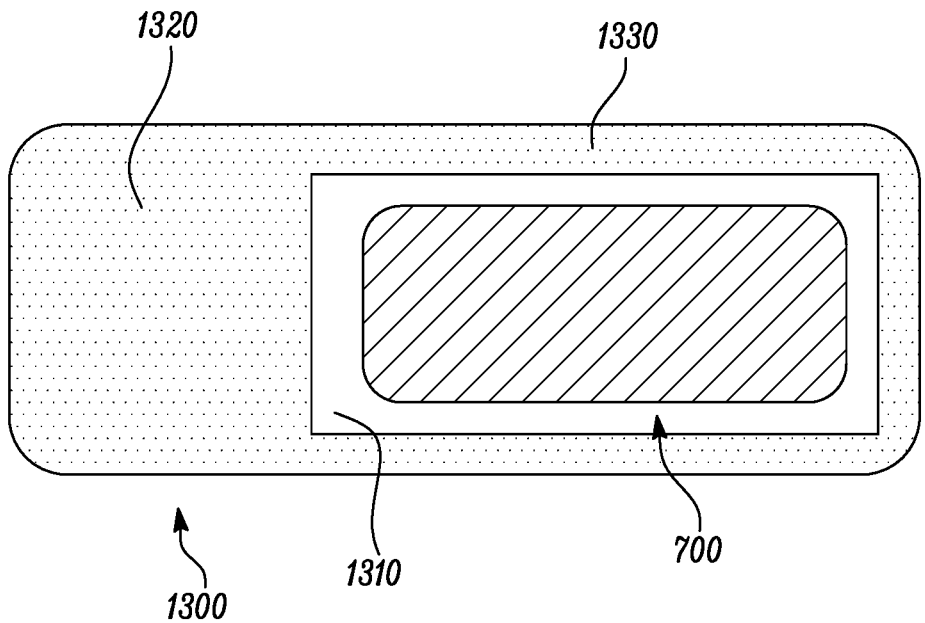
FIG. 11 is a sectional plan view of an object with a rectangular cross section with a complementary object disposed within the object.

FIG. 11 shows a complementary object 700 placed within the cavity or void 1310 of an object 1300. As shown in the figure, the complementary object is placed within the object so that in at least one plane the complementary object is totally surrounded by the object. There may be considerable variation in the material thickness across the object with a relatively thick region 1320 on one side of the object and thin walls 1330 forming a void on the other. This can make it difficult to set parameters for scanning which work over the different thicknesses facing the scanner at different angles of rotation. For example, a high scanning power may be required to penetrate the thick material region of the object, but this may subsequently reduce the scan quality of the thin wall region as the high-power x-rays experience little attenuation in this region.

Contrary to known teachings, the inventor surprisingly found that introducing more material for the x-rays to penetrate may improve the scan quality of the object. Filling the void of the object with the complementary object provides a more even material thickness across the object. Hence, the power of the scanner may be adjusted to levels where previously image contrast would be reduced in part of the object. The adjusted power may result in a relatively even contrast across the object and hence an improvement in scan quality. Of course, other scanning parameters may be adjusted and optimised to improve the quality and efficiency of scanning the plurality of objects.

As for all arrangements disclosed herein, the complementary object may be a solid volume or may have a cavity which may be filled by a filling material such as a powder or grain or air. The complementary object and object may be disposed so that their surfaces are in direct contact, or they may be separated by a border region, made from, for example, a polymer film or an air gap. The complementary object may be wrapped or covered, completely or partially, in a film or sleeve to separate it from the object. Additionally or alternately, the object may be wrapped or covered in the film or sleeve. The film or sleeve may provide a region between the surface of the complementary object and the object with an imaging beam attenuation different from the object's imaging beam attenuation. For example, a polymer film may have a lower imaging beam attenuation (or lower density) than a metal object. Thus, there will be a contrast at the region-object boundary of the scan. This may aid in the identification of the object in the image scan. It may be that the surface or walls of the complementary object are made from a material with a different imaging beam attenuation than the object, thus providing a region of image contrast between the object and complementary object.

Figure 12:
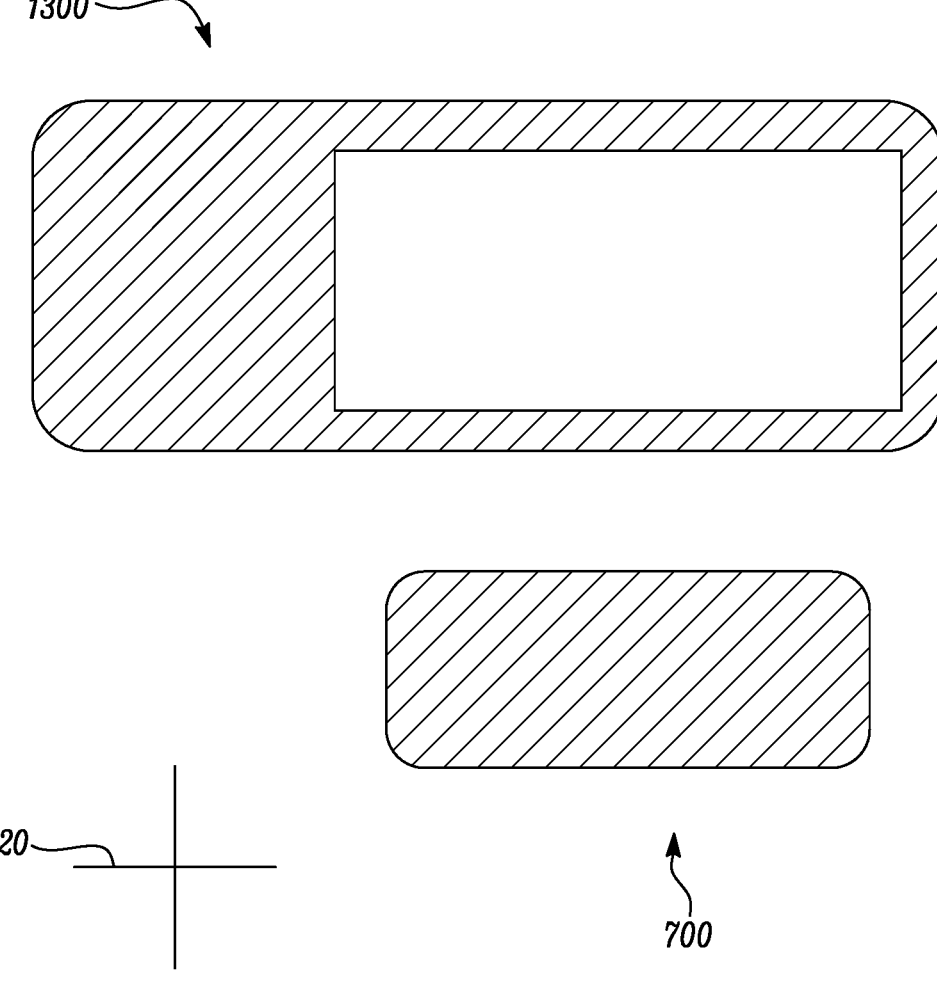
FIG. 12 is another sectional plan view of the object with a rectangular cross section with the complementary object disposed adjacent the object.

FIG. 12 shows an arrangement similar to that in FIG. 11 but with the complementary object 700 disposed adjacent the section of the object with the hollow cavity 1310. The complementary object again acts to provide an even material thickness and reduces the variation in imaging beam attenuation across the complementary object and object when scanned.

The object and complementary object may be disposed on the support so that the complementary object is closer to the axis of rotation 20 than the object. This is shown, by way of example, in FIG. 12. The extra material from the complementary object in the inner region of the support allows for the power of the scanner to be adjusted so that the object in the outer, "brighter" region of the support has a relatively even contrast across its cross-section, thereby improving scan quality. Of course, other scanning parameters may be adjusted and optimised to improve the quality and efficiency of scanning the plurality of objects.

The complementary object may be disposed adjacent the section of the object with the hollow cavity in circumstances when, for example, the complementary object cannot fit within the object. The object may have totally enclosed internal voids or may be inaccessible. Of course, the complementary may be placed adjacent the object in arrangements where the internal voids of the object are accessible. The complementary object is specifically shaped and oriented relative to the object to even out the material thickness.

Figure 13:
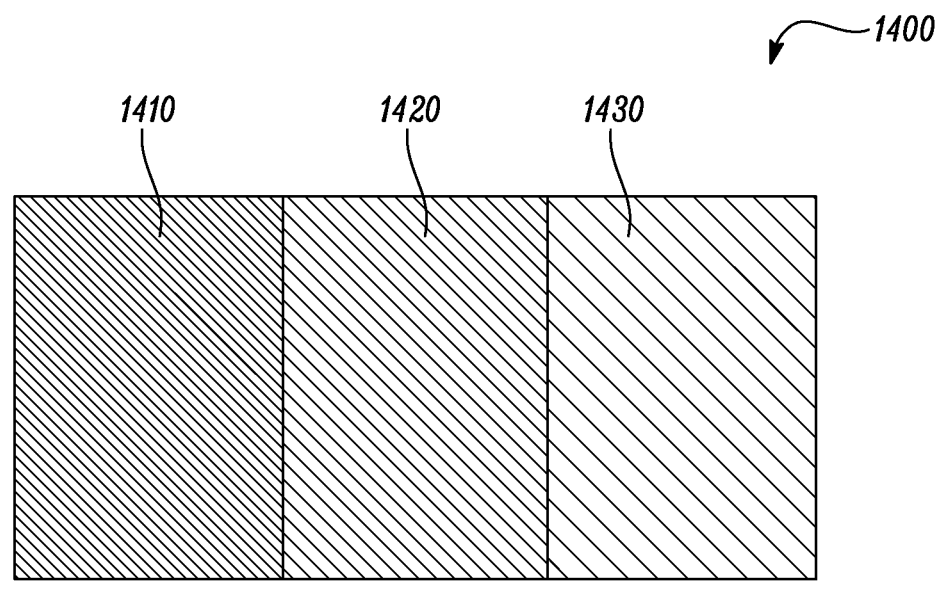
FIG. 13 is a sectional plan view of an object with a variable density profile disposed adjacent a complementary object with a complementary density profile.
Figure 13:
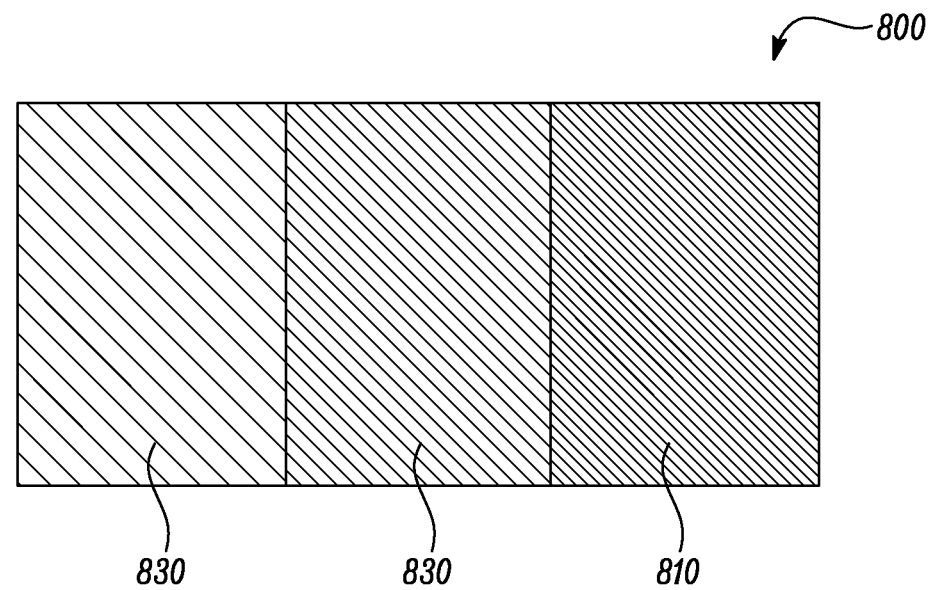

FIG. 13 shows an arrangement in which a variable density object 1400, having for example a relatively high density 1410, medium density 1420, and low density region 1430, across its extent, is placed adjacent a complementary object which has an inverse, or complementary, density profile 810-830. That is, the high density region of the object 1410 is adjacent the low-density region 830 of the complementary object, for example. The object and the complementary object are placed in an orientation relative to each other so that for one or more projections taken by the scanning apparatus, each projection taken at a different relative angle of rotation, the variation in the average density across the complementary object and object is reduced. Hence, the variation in imaging beam attenuation across the complementary object and the object is reduced.

The inventor has come to the realisation that by evening out the material density, by disposing the object (or a plurality of objects) with a complementary object having a complementary density profile, the image quality and contrast of the 3DCT scan may be improved. Contrary to the established view that an increase in dense material reduces scan quality, the inventor has found that any decline in quality is not significant. In fact, the inventor has come to the surprising realisation that the scan quality may be improved as positioning a relatively dense region of the complementary object adjacent a low density region of the object allows for more power to be used for the scan without oversaturating the detector. Hence an even image contrast across the object may be obtained. Also, scanning parameters such as the power to voxel size ratio, sometimes referred to as the power to voxel ratio, are easier to adjust to desirable values when the density to be scanned of the objects varies less. Optimising the software scanning parameters may further improve the scanning efficiency.

It will be appreciated that the variable densities may be formed from solid volumes or filling materials or a combination of both. The part of the object to be scanned is shown as having three different densities, however, in other arrangements the object may have more or fewer densities. For example, the object may have a continuously varying density profile.

FIG. 14 shows an arrangement of an object similar or identical to those in FIG. 6, but with the complementary object 900 positioned spaced from the object 1000. In this arrangement the complementary object and object are oppositely disposed on either side of the support.

The convex surface of the object extends outwardly between the extremities of the two thin edges and the concave surface extends in a similar manner to the concave surface, but with an inward curve. The complementary object has an elliptical cross section and is positioned opposite but spaced from the convex surface of the object.

The complementary object is formed from a solid wall 912, extending from a base (not shown) and is filled with a filling material 914. Of course, the complementary object may be formed from a solid material such as the solid material 310 in FIG. 6 or both.

The inventor found a region of the support where the x-ray power is relatively constant, as indicated by the region between the inner notional circle 950 and outer notional circle 960 in FIG. 14. In this "brighter" scanning region the contrast across the object and complementary object is relatively even, leading to improved scan quality. The region between the notional circles form a 'virtual' or hollow cylinder where scan quality may be highest. The region inside the inner notional circle indicates an area of the scanning support with high intensity x-rays which may reduce the scan quality by causing, for example, beam hardening artifacts.

The inventor found that the highest scan quality could be achieved when the combined configuration of the complementary object and object form an essentially circular, or hollow circle, cross sections. However, as shown in FIG. 14 the objects may only fill a certain area of the cross section and still maintain a high scan quality. That is, for example, the area between the inner and outer notional circles forms the hollow circular cross section and the object and complementary object only occupy a small area of this cross section. The complementary object is specifically shaped and oriented relative to the object to even out the material thickness.

Figure 15:
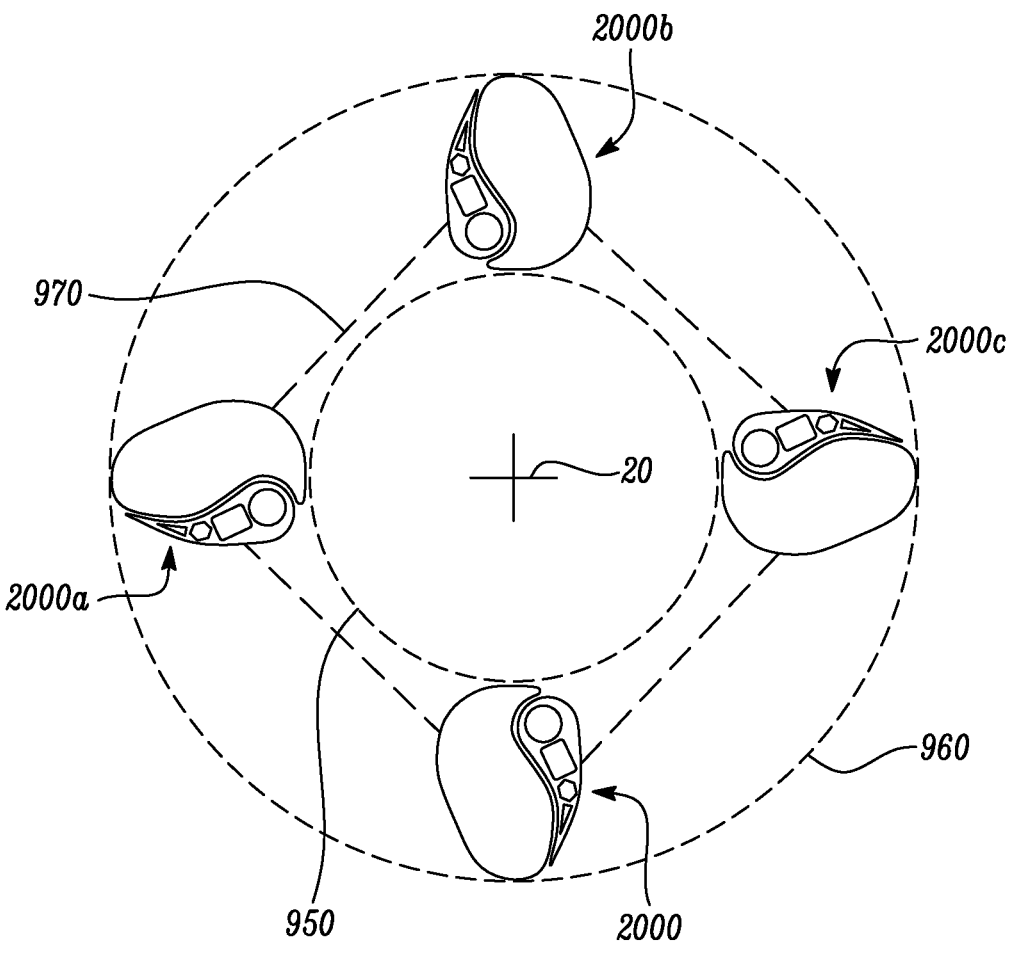
FIG. 15 is a sectional plan view of a plurality of configurations of turbine blades and complementary objects, each disposed relative to an axis of rotation of a support in a CT scanning apparatus.

FIG. 15 shows a sectional view of a plurality of the arrangements, as shown in FIG. 4*a*, disposed relative to the axis of rotation. The turbine blade 100 and the complementary object 200 may be thought of as forming a configuration 2000.

This arrangement may be realised by considering a notional geometric FIG. 970 with four vertices and positioned with its centre of symmetry on the axis of rotation. A plurality of, in this case four, turbine blades and associated complementary objects are placed on the vertices of the geometric figure. Of course, any other arrangement with an object and complementary object, for example those described herein, may be disposed on the vertices of the geometric figure. Further, different arrangements may be disposed on different vertices of the geometric figure.

The objects and complementary objects may be disposed on the vertices of the notional geometric FIG. 970 so that that a notional line drawn from the emitting element to the receiving element through the axis of rotation intersects two or more of the configurations for at least a third of the projections.

The inventor found that positioning a plurality of objects on the vertices of a geometric figure may improve the image quality and contrast of a CT scan as the thickness of material the x-ray beam penetrates during each projection is evened out. In a scan of objects or parts of objects offset from the axis of rotation, the inner sides of the objects or parts of the objects will be in the "darker" region of the support than the outer sides. Introducing more material for the x-rays to penetrate may improve the scan quality as the power of the scanner may be adjusted to levels where previously image contrast would be reduced.

The inventor found a region of the support where the x-ray power is relatively constant, as indicated by the region between the inner notional circle 950 and outer notional circle 960 in FIG. 15. In this "brighter" scanning region the contrast across the object and complementary object is relatively even, leading to improved scan quality. As before, the region between the notional circles forms a 'virtual' or hollow cylinder. The region inside the inner notional circle indicates an area of the scanning support with high intensity x-rays which may reduce the scan quality by causing, for example, beam hardening artifacts.

As will be appreciated, this arrangement is not limited to four sets of the object and complementary object configuration. More or fewer sets of the configuration may be used. It is also understood that the number of vertices of the geometric shape is not limited to four, more of fewer vertices may be used. For example, the outline formed by increasing the number of configurations disposed on the vertices of a geometric figure may be closer to the ideal "hollow" cylinder described above. That is, more of the region between the inner and outer notional circles is filled with material.

It will be understood that the area of the region, denoting a relatively even imaging beam strength, between the inner and outer notional figures maybe be increased or decreased by varying the scanning parameters of the scanning apparatus. For example, scanning parameters, such as power and/or power to voxel ratio, may be adjusted and optimised to alter the "brightness" region, therefore leading to an even image contrast across the extent of the object(s).

The skilled reader will understand that the orientation of the four objects relative to each other and the axis of rotation may be varied to improve the image quality and contrast of the objects. For example, the objects (and/or complementary objects) may be oriented to provide rotational symmetry of the pattern of objects about the axis of rotation. In the case where the objects are substantially similar, or identical, the order of rotational symmetry may be equal to the number of vertices of the regular geometric figure.

Figure 16:
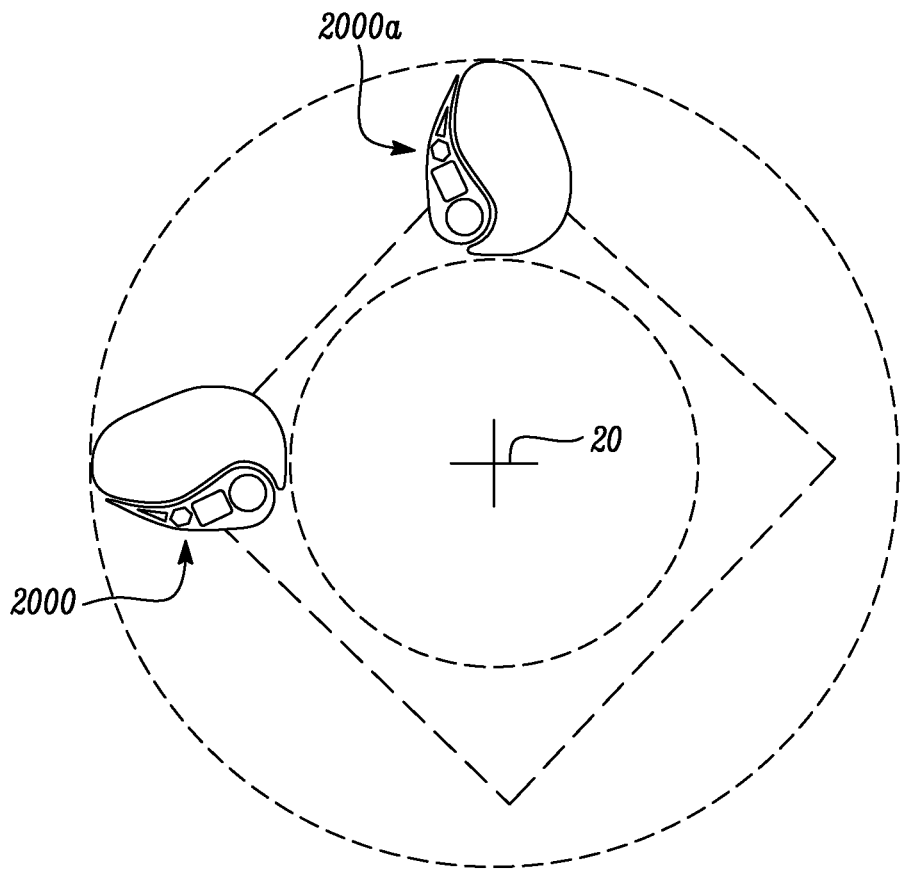
FIG. 16 is another sectional plan view of a plurality of configurations of turbine blades and complementary objects, each disposed relative to an axis of rotation of a support in a CT scanning apparatus.

FIG. 16 shows the configuration, as in FIG. 15, disposed on some, but not all of, the vertices of the notional regular geometric FIG. 970. The configurations may be, for example, positioned on two adjacent vertices of the geometric figure. Considering a notional regular geometric shape such as the square shown in FIG. 15, with a centre of symmetry aligned with the axis of rotation, the first configuration 2000 and second configuration 2000*a* are on two adjacent vertices of the geometric figure.

Positioning first and second configurations on the vertices of the geometric figure may improve the image quality and contrast of the first configuration of objects and/or the second configuration of objects. The skilled reader will understand that the orientation of the first configuration relative to the second configuration may be varied to improve the image quality and contrast of the first configuration and/or the second configuration.

The inventor was surprised to find that if, for example, the configurations are disposed to take up only half of the available vertex positions, and therefore leave half the field clear, the scan quality may be improved.

Figure 17:
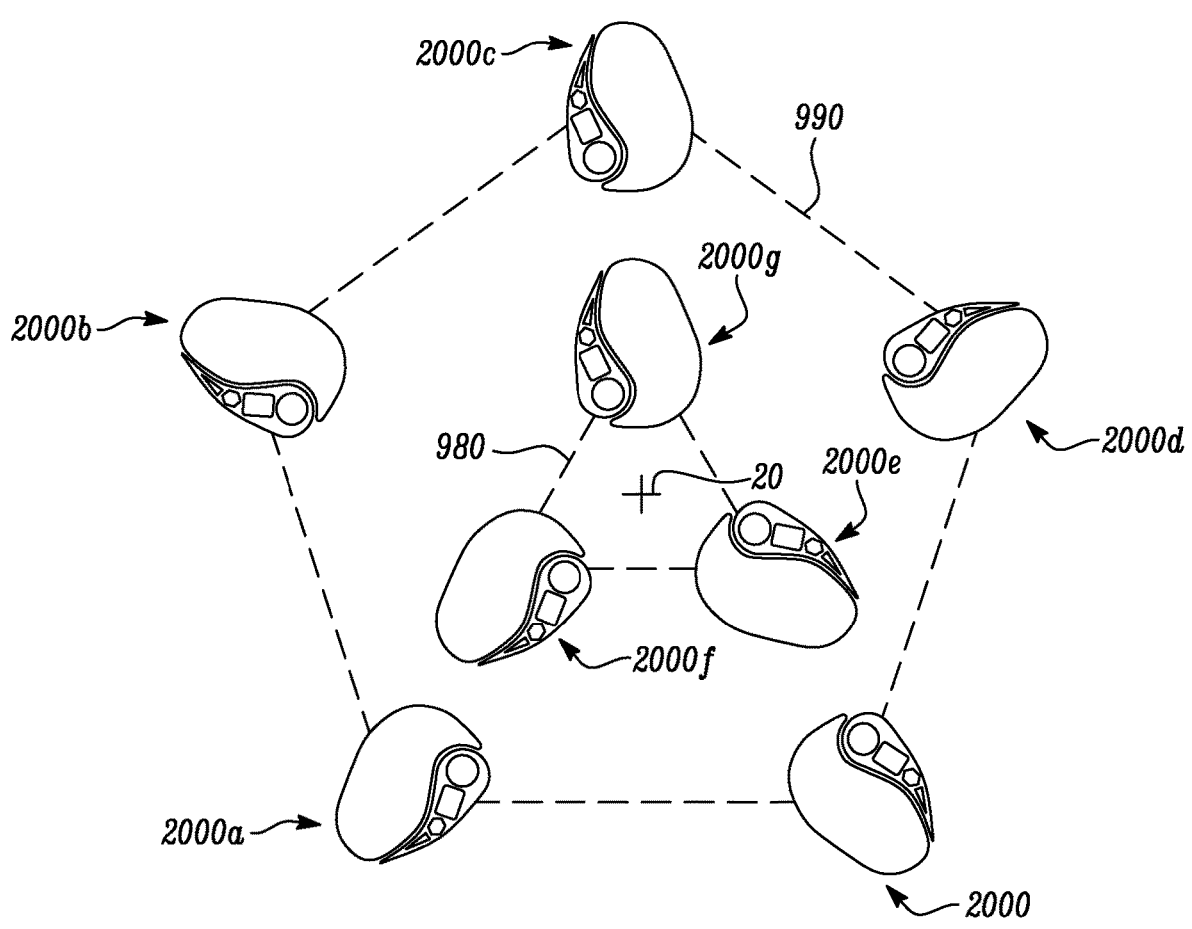
FIG. 17 is another sectional plan view of a plurality of configurations of turbine blades and complementary objects, disposed on the vertices of a notional geometric figure and an inner notional geometric figure.

FIG. 17 shows a plurality of turbine blades disposed adjacent complementary objects and placed relative the axis of rotation of the support. Considering a notional regular geometric FIG. 990, the configurations 2000-2000g may be disposed on the vertices of a pentagon (shown with a dashed line in the figure) and on the vertices of a further notional regular geometric FIG. 980, in this example a triangle (shown with a dashed line in the figure), inside the notional regular geometric figure. Of course, geometric figures with a different number of vertices may be used.

In a scan of objects and complementary objects offset from the axis of rotation, the inner side of the objects and complementary objects (that is, the side closer to axis of rotation) will be darker in the image scan than the outer side. Introducing more material inside the notional geometric figure by, for example, arranging further objects and complementary object in a pattern around an inner notional figure, may improve the scan quality of the objects in the outer region. The objects and complementary objects may, for example, be placed within the inner notional circle as described in relation to FIGS. 14 and 15. The extra material in the "darker", inner region of the support attenuate the high energy x-rays and allow for the power of the scanner to be adjusted so that the objects and complementary objects on the outer geometric figure have a relatively even contrast across their cross-sections. The high-energy x-rays in the inner region of the scanner are attenuated by the inner objects and complementary objects and therefore may not be of a high enough energy to causes a reduction in contrast of, for example, thinner areas of the outer objects.

As will be appreciated, this arrangement may apply to any object placed relative to a complementary object, and objects of different size and shape may be used in the same scan. Further, the configurations in FIG. 17 show the object and complementary object placed directly adjacent each other, however, in another arrangement the complementary object may be disposed spaced from the object on an opposite vertex to the object or may be placed within the object. Additionally or alternatively, an attenuating object or objects (not shown here, for example a solid cylinder) may be disposed in the inner region, such as centred on the axis.

The invention claimed is:

1. A method for scanning a plurality of objects in a scanning apparatus, the method comprising:
   disposing the plurality of objects and complementary objects on a support of the scanning apparatus so that the objects and complementary objects are positioned between an imaging beam emitting element and an imaging beam receiving element oppositely disposed to either side of the support, wherein the support is rotatable relative to the emitting and receiving elements about an axis of rotation to allow creation of an image from projections each taken at a different relative angle of rotation and a notional line drawn from the emitting element to the receiving element through the axis of rotation intersects two or more of the plurality of objects and complementary objects for at least a third of the projections;
   wherein volumes of the complementary objects are solid or filled with a filling material and the complementary objects are configured to reduce the variation in imaging beam attenuation across the complementary objects and the objects or a part to be scanned of the objects at the different relative angles of rotation;
   the method further comprising:
   operating the scanning apparatus at the different relative angles of rotation to produce an image of the objects.

2. A method according to claim 1, wherein the complementary objects do not completely surround the objects or the part to be scanned of the objects and/or the complementary objects are positioned either adjacent to the objects, spaced from the objects or internally within the objects.

3. A method according to claim 1, wherein the objects and complementary objects are positioned on the support in a configuration that reduces the variation in material thickness penetrated at the different relative angles of rotation.

4. A method according to claim 1, wherein facing surfaces of the objects or part to be scanned of the objects and complementary objects are equally spaced across their full extent.

5. A method according to claim 1, wherein the filling material or the solid volume has an imaging beam attenuation close to the imaging beam attenuation of the material of the objects or part to be scanned of the objects.

6. A method according to claim 1, further comprising filling the volume of the complementary objects with the filling material.

7. A method according to claim 1, wherein the filling material is in the form of a powder, grains or a fluid of the same material as the objects or part to be scanned of the objects.

8. A method according to claim 1, wherein a resultant combined cross section of the complementary objects and objects or part to be scanned of the objects is circular or nearly circular or forms an annulus or near annulus.

9. A method according to claim 1, wherein the objects and complementary objects are in an adjacent configuration, the configuration further comprising a border region between the objects or part to be scanned of the objects and the complementary objects with an imaging beam attenuation different from the imaging beam attenuation of the objects or part to be scanned of the objects.

10. A method according to claim 9, wherein the complementary objects are within the objects and a border region is formed by surrounding or partially surrounding the objects or complementary objects with a protective film or wall or sleeve.

11. A method according to claim 1, wherein the complementary objects are positioned on the support offset from the axis of rotation.

12. A method according to claim 1, wherein the objects or part to be scanned of the objects have a density variation, and the complementary objects have a complementary density variation such that for one or more of the projections each taken at a different relative angle of rotation the variation in the average density across the complementary objects and objects or part to be scanned of the objects are reduced.

13. A method according to claim 1, wherein the complementary objects include a void to complement a void in the objects and/or the shape of the objects.

14. A method according to claim 1, wherein the objects or part to be scanned of the objects and complementary objects are positioned in a pattern on vertices of a notional regular geometric figure centred on the axis of rotation and further objects and complementary objects are positioned in a pattern on inner vertices of a further notional regular geometric figure centred on the axis of rotation and inside the notional regular geometric figure.

15. A method according to claim 14, wherein the objects or parts to be scanned of the objects and complementary objects are positioned on some but not all of the vertices of the notional regular geometric figure.

16. A method according to claim 1, wherein the objects are turbine blades, each with a leading edge and a trailing edge separated by blade surfaces.

17. A method according to claim 1, wherein the scanning apparatus is a computational tomography scanning apparatus and the imaging beam is an x-ray.

18. A combination of a scanning apparatus for scanning a plurality of objects and complementary objects in the scanning apparatus, the scanning apparatus comprising:

a support for the objects and the complementary objects; and an imaging beam emitting element and an imaging beam receiving element oppositely disposed to either side of the support, wherein the support is rotatable relative to the emitting and receiving elements about an axis of rotation to allow creation of an image of the objects from projections each taken at a different relative angle of rotation and a notional line drawn from the emitting element to the receiving element through the axis of rotation intersects two or more of the plurality of objects and complementary objects for at least a third of the projections; and the complementary objects comprising:

a volume which is solid or filled with a filling material, wherein the complementary objects are configured to reduce the variation in imaging beam attenuation across the complementary objects and the objects at the different relative angles of rotation so that when the scanning apparatus is operated at the multiple relative angles of rotation it produces an image of the complementary objects and objects.

\* \* \* \* \*